(12) United States Patent  
Rivir et al.

(10) Patent No.: US 7,112,120 B2
(45) Date of Patent: Sep. 26, 2006

(54) FEEDER ASSEMBLY FOR PARTICLE BLAST SYSTEM

(75) Inventors: Michael E. Rivir, Loveland, OH (US); Daniel Mallaley, Loveland, OH (US); Richard J. Broecker, Loveland, OH (US); R. Kevin Dressman, Loveland, OH (US); Kevin P. Alford, Loveland, OH (US)

(73) Assignee: Cold Jet LLC, Loveland, OH (US)

( * ) Notice: Subject to any disclaimer, the term of this patent is extended or adjusted under 35 U.S.C. 154(b) by 478 days.

(21) Appl. No.: 10/123,974

(22) Filed: Apr. 17, 2002

(65) Prior Publication Data

US 2003/0199232 A1 Oct. 23, 2003

(51) Int. Cl.
*B24B 1/00* (2006.01)

(52) U.S. Cl. .......................... 451/38; 451/39; 451/40; 451/91; 451/99; 222/170

(58) Field of Classification Search .................. 451/38, 451/39, 40, 75, 99, 94, 91; 222/170, 162, 222/196, 361; 62/35, 384, 604; 134/7
See application file for complete search history.

(56) References Cited

U.S. PATENT DOCUMENTS

| | | | |
|---|---|---|---|
| 2,235,324 A | 3/1941 | Moreland | 18/55 |
| 2,246,497 A | 6/1941 | Beck | 221/120 |
| 2,254,448 A | 9/1941 | Pursel | 259/39 |
| 2,640,629 A | 6/1953 | Thomson et al. | 222/161 |
| 3,219,393 A | 10/1961 | Starrett | |
| 3,101,853 A | 8/1963 | Long et al. | |
| 3,130,879 A | 4/1964 | Messing | |
| 3,151,784 A | 10/1964 | Tailor | |
| 3,245,590 A | 4/1966 | Hawkins | |
| 3,257,040 A | 6/1966 | Dumbaugh et al. | 222/161 |
| 3,324,605 A | 6/1967 | Lester | |
| 3,556,355 A | 5/1968 | Ruiz | |
| 3,407,972 A | 10/1968 | Cymbalisty | 222/193 |
| 3,633,797 A | 6/1970 | Graff | |
| 4,031,032 A | 6/1977 | Jablecki | 210/474 |
| 4,058,986 A | 11/1977 | Granholm | 61/63 |
| 4,067,150 A | 1/1978 | Merrigan | 51/436 |
| 4,094,448 A | 6/1978 | Häseler et al. | 222/342 |
| 4,180,188 A | 12/1979 | Aonuma et al. | |
| 4,372,338 A | 2/1983 | Efferson | |
| 4,389,820 A | 6/1983 | Fong et al. | |
| 4,536,121 A | 8/1985 | Stewart et al. | |
| 4,617,064 A | 10/1986 | Moore | |
| 4,707,951 A | 11/1987 | Gibot | 51/410 |
| 4,744,181 A | 5/1988 | Moore et al. | |
| 4,843,770 A | 7/1989 | Crane et al. | |
| 4,906,144 A * | 3/1990 | Matsueda | 406/65 |

(Continued)

FOREIGN PATENT DOCUMENTS

DE 609842 2/1935

(Continued)

*Primary Examiner*—Eileen P. Morgan
(74) *Attorney, Agent, or Firm*—Frost Brown Todd

(57) ABSTRACT

A particle blast system includes a feeder assembly having a rotor with a plurality of pockets formed in the peripheral surface. The transport gas flowpath includes the pockets, such that substantially all transport gas flows through the pockets. The seal adjacent the peripheral surface is actuated by the transport gas pressure to urge its sealing surface against the rotor's peripheral surface. At start up, there is no substantial pressure between the seal and the rotor, reducing start up torque requirements.

32 Claims, 20 Drawing Sheets

U.S. PATENT DOCUMENTS

| | | |
|---|---|---|
| 4,947,592 A | 8/1990 | Lloyd et al. |
| 5,018,667 A | 5/1991 | Lloyd |
| 5,050,805 A | 9/1991 | Lloyd et al. |
| 5,109,636 A | 5/1992 | Lloyd et al. |
| 5,188,151 A | 2/1993 | Young et al. |
| 5,301,509 A | 4/1994 | Lloyd et al. |
| 5,405,049 A | 4/1995 | Ricciardi ........................ 222/1 |
| 5,445,553 A * | 8/1995 | Cryer et al. .................... 451/7 |
| 5,473,903 A | 12/1995 | Lloyd et al. |
| 5,492,497 A | 2/1996 | Brooke et al. ................ 451/99 |
| 5,571,335 A | 11/1996 | Lloyd |
| 5,618,177 A | 4/1997 | Abbott ........................ 51/423 |
| 5,660,580 A | 8/1997 | Lehnig |
| 5,685,435 A | 11/1997 | Picioccio et al. ............ 209/677 |
| 5,716,113 A | 2/1998 | Plourde ........................ 312/15 |
| 5,765,728 A * | 6/1998 | Simpson et al. ......... 222/146.2 |
| 5,795,214 A | 8/1998 | Leon |
| 6,148,636 A | 11/2000 | Wade, Jr. ...................... 62/604 |
| 6,188,936 B1 | 2/2001 | Maguire et al. ............. 700/265 |
| 6,726,549 B1 * | 4/2004 | Rivir et al. .................... 451/99 |
| 6,890,246 B1 * | 5/2005 | Yamaharu .................... 451/99 |

FOREIGN PATENT DOCUMENTS

| | | |
|---|---|---|
| EP | 0786311 | 7/1997 |
| FR | 547153 | 12/1922 |

* cited by examiner

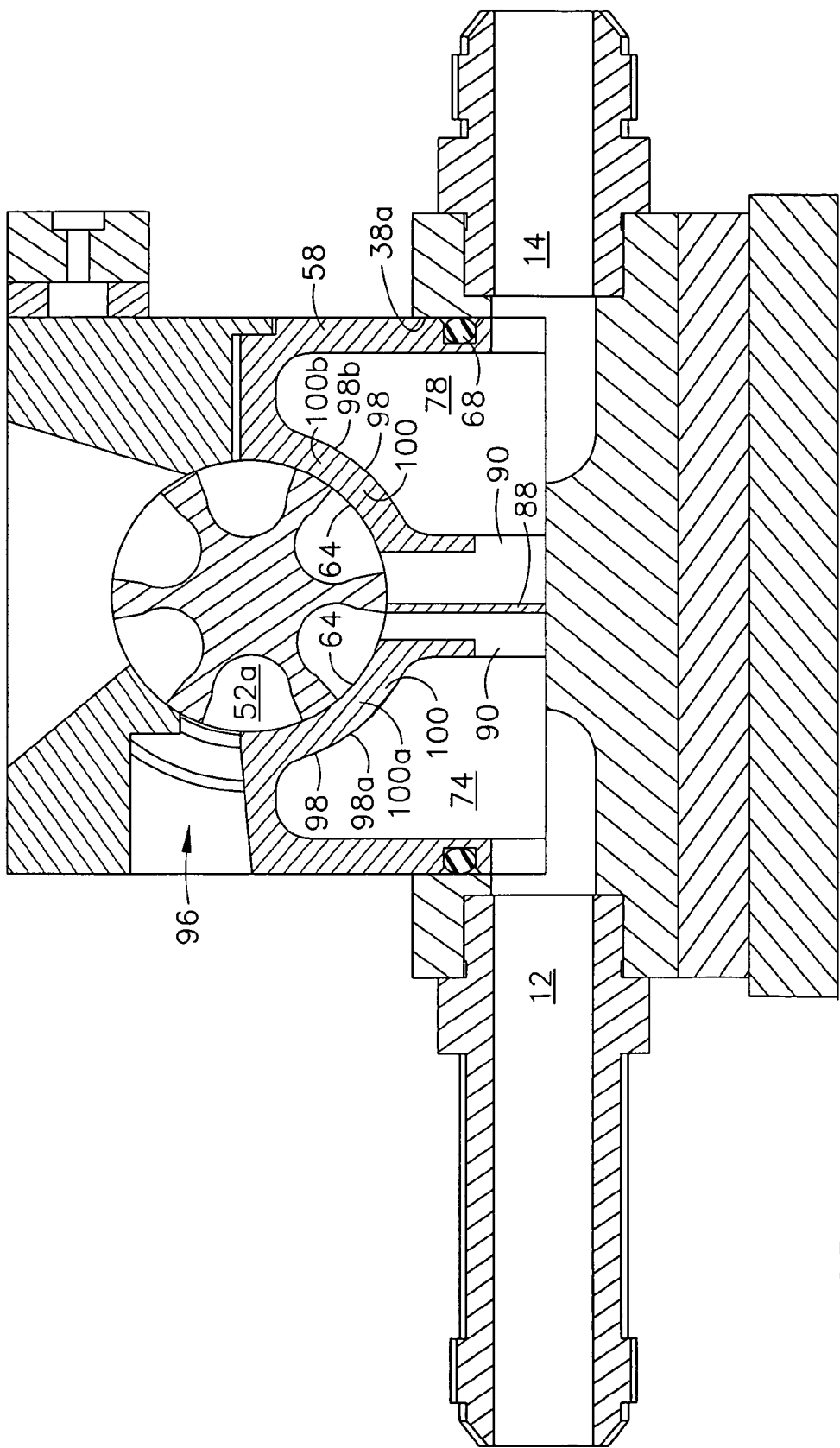

FEEDER ASSEMBLY FOR PARTICLE BLAST SYSTEM

BACKGROUND OF THE INVENTION

The present invention relates generally to particle blast systems, and is particularly directed to a device which provides improved introduction of particles into a transport gas flow for ultimate delivery as entrained particles to a workpiece or other target. The invention will be specifically disclosed in connection with a transport mechanism in a cryogenic particle blast system which introduces particles from a source of such particles, such as a hopper, into the transport gas flow.

Particle blasting systems have been around for several decades. Typically, particles, also known as blast media, are fed into a transport gas flow and are transported as entrained particles to a blast nozzle, from which the particles exit, being directed toward a workpiece or other target.

Carbon dioxide blasting systems are well known, and along with various associated component parts, are shown in U.S. Pat. Nos. 4,744,181, 4,843,770, 4,947,592, 5,050,805, 5,018,667, 5,109,636, 5,188,151, 5,301,509, 5,571,335, 5,301,509, 5,473,903, 5,660,580 and 5,795,214, and in commonly owned co-pending applications Ser. No. 09/658,359, filed Sept. 8, 2000, titled Improved Hopper and Ser. No. 09/369,797, filed Aug. 6, 1999, titled Non-Metallic Particle Blasting Nozzle With Static Field Dissipation, all of which are incorporated herein by reference. Many prior art blasting system, such as disclosed therein, include rotating rotors with cavities or pockets for transporting pellets into the transport gas flow. Seals are used in contact with the rotor surface in which the cavities or pockets are formed. Such seals are usually urged against the rotor surface independent of whether the rotor is rotating or the system is operating. The seal force results in seal drag, creating a resisting torque which has to be overcome by the motor. When the torque is present at the time the rotor is started turning, a substantial start up load is placed on the motor, affecting the size and wear of the motor. The prior art large diameter rotors also provide a sizable moment arm through which the seal drag produces substantial torque.

At least for prior art rotors which utilize pockets formed in a peripheral rotor surface, not all pellets are discharged from the pockets at the discharge station. Additionally, the pocket spacing and lack of thorough, uniform mixing of the transport gas and pellets in the feeder results in pulses.

Although the present invention will be described herein in connection with a particle feeder for use with carbon dioxide blasting, it will be understood that the present invention is not limited in use or application to carbon dioxide blasting. The teachings of the present invention may be used in application in which there can be compaction or agglomeration of any type of particle blast media.

BRIEF DESCRIPTION OF THE DRAWING

The accompanying drawings incorporated in and forming a part of the specification illustrate several aspects of the present invention, and together with the description serve to explain the principles of the invention. In the drawings:

FIGS. 8A–I are cross-sectional views of the feeder assembly taken along line 8—8 of FIG. 7, showing the rotor in successive rotational orientations.

Reference will now be made in detail to the present preferred embodiment of the invention, an example of which is illustrated in the accompanying drawings.

DETAILED DESCRIPTION OF AN EMBODIMENT OF THE INVENTION

Figure 1:
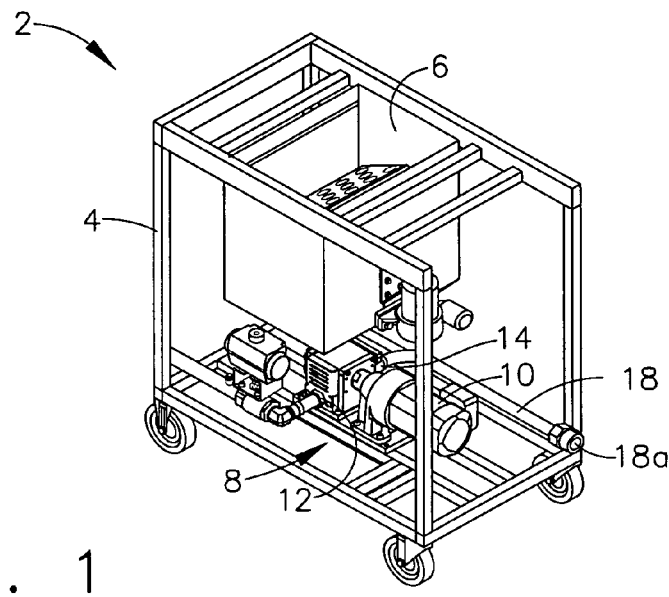
FIG. 1 is a perspective side view of a particle blast system constructed in accordance with the teachings of the present invention.

Referring now to the drawings in detail, wherein like numerals indicate the same elements throughout the views, FIG. 1 shows particle blast system, generally indicated at 2, with the outside cover omitted for clarity. Particle blast system 2 includes frame 4 which supports the various components. Particle blast system 2 includes hopper 6, which holds the blast media (not shown), functioning as a source of blast media. In the embodiment depicted, particle blast system 2 is configured to use sublimeable particles, particularly carbon dioxide pellets, as the blast media. It is noted that the present invention may be used with a wide variety of blast media, including non-cryogenic blast media.

Figure 4:
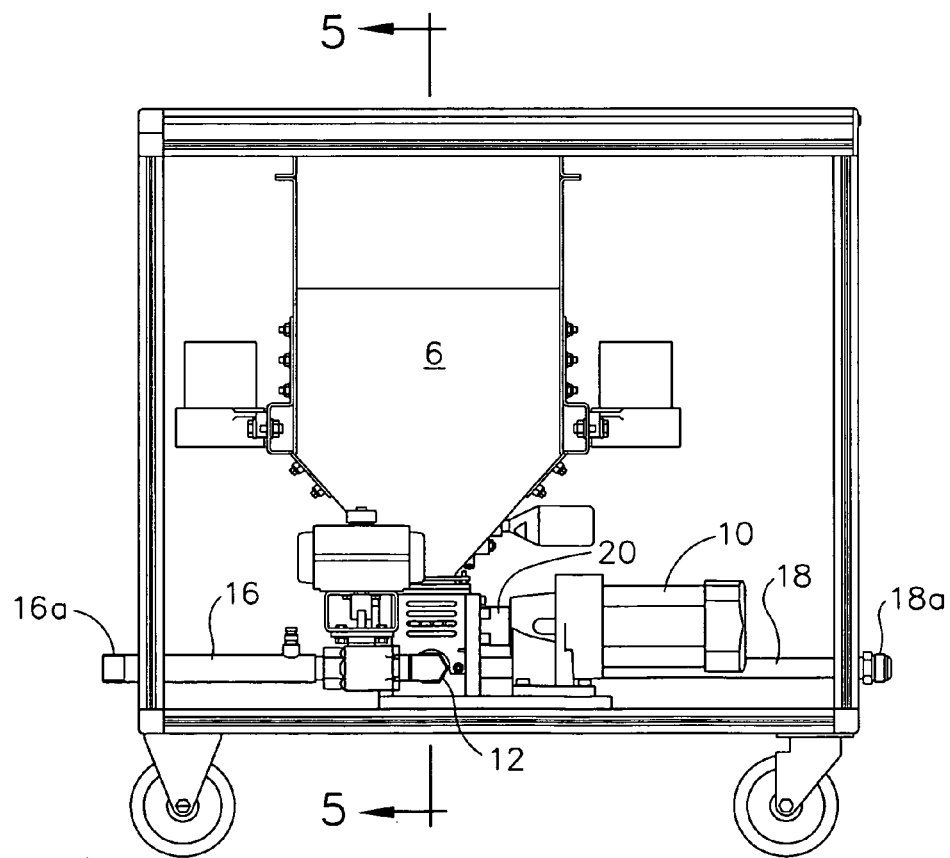
FIG. 4 is a side view of the particle blast system of FIG. 1.

Particle blast system 2 includes feeder assembly 8, also referred to as the feeder, which is driven by motor 10. Feeder 8 includes inlet 12 and outlet 14. A transport gas flowpath is formed within feeder 8 between inlet 12 and outlet 14 (not seen in FIG. 1) as described hereinafter. Inlet 12 is connected to a source of transport gas, and outlet 14 is connected to the delivery hose (not shown) which transports the carbon dioxide pellets entrained in the transport gas to the blast nozzle (not shown). As can be seen in FIGS. 1 and 4, conduit 16 is connected to inlet 12, and includes end 16a extending outside of frame 4 for easy connection to a source of transport gas. FIG. 1 illustrates outlet 14 as being connected to hose 18, which includes end 18a extending outside of frame 4 for easy connection to the delivery hose (not shown).

As is well known, the transport gas may be at any pressure and flow rate suitable for the particular system. The operating pressures, flow rates and component (such as compressor) size are dependant on the cross-section of the system blast nozzle (not shown). The source of transport gas may be shop air. Typically, despite treatment, the transport gas will have some humidity left in it. In the depicted embodiment, the transport gas at the rotor had a pressure of about 80 PSIG with a nominal flow rate of 150 SCFM, at around room temperature, which matched the particular system blast nozzle used. The operating pressure for such a system ranges from about 30 PSIG to about 300 PSIG, the upper maximum being dictated by the rating of the components. The maximum rotor speed was about 70 RPM, at which the system delivered approximately 7 pounds of $CO_2$ pellets per minute.

Figure 2:
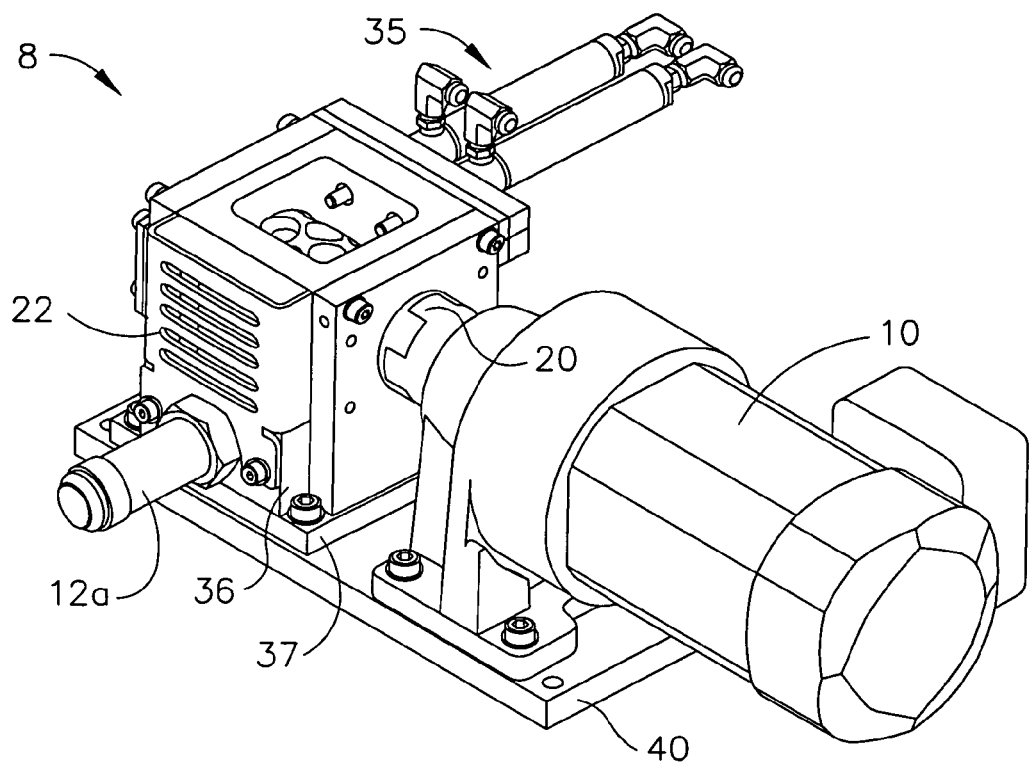
FIG. 2 is a perspective view of the feeder assembly and motor of the particle blast system of FIG. 1.
Figure 3:
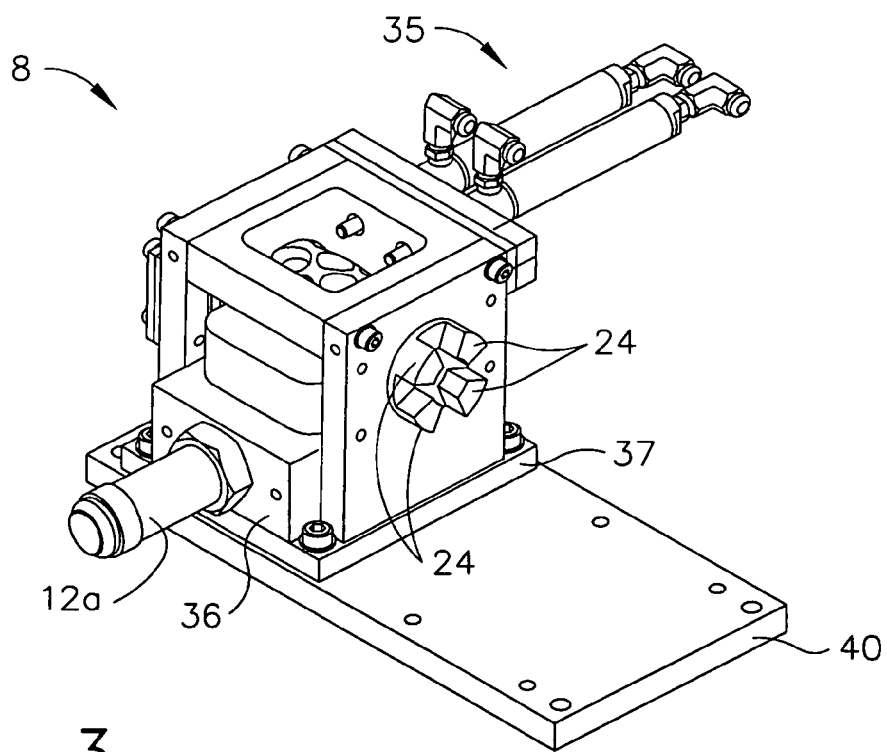
FIG. 3 is a perspective view of the feeder assembly of the particle blast system of FIG. 1, similar to FIG. 2 but without the motor.

FIG. 2 shows feeder assembly 8 connected to motor 10, through coupling 20. As can be seen in FIG. 3, from which motor 10 and cover 22 have been omitted, coupling 20 is a jaw type coupling formed by the intermeshing of a plurality of legs 24 which extend from an end of rotor 26. Complementarily shaped legs are found on motor 10, providing easy disengagement through axial movement between motor 10 and rotor 26. Coupling 20 allows radial and axial misalignment and provides for easy disassembly.

Figure 5:
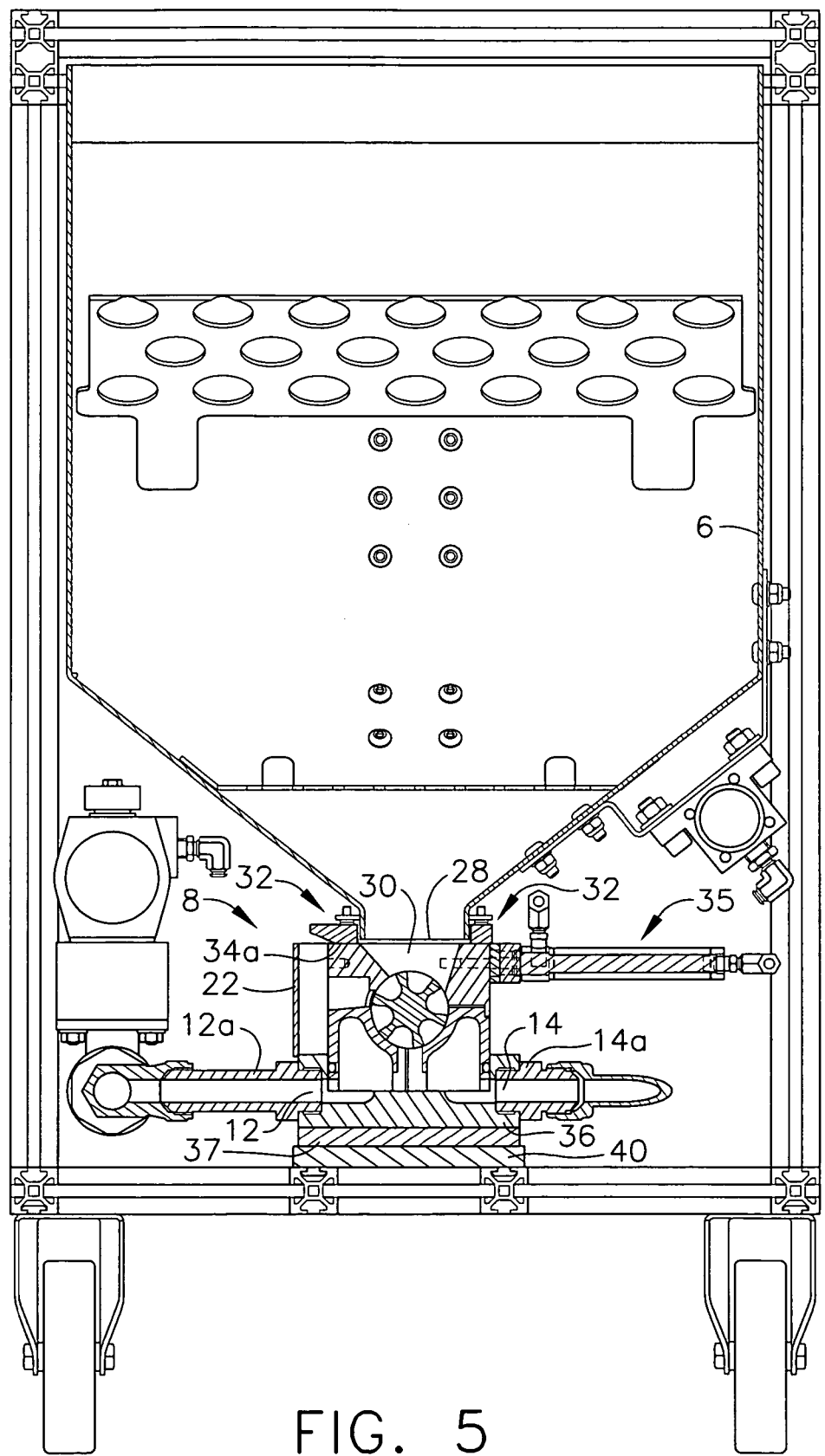
FIG. 5 is cross-sectional view of the particle blast system taken along line 5—5 of FIG. 4.

FIG. 5 illustrates a cross sectional view of hopper 6 and feeder 8. As shown, hopper exit 28 is aligned with inlet 30 of feeder 8. Seal assembly 32 seals between exit 28 and feeder 8, sealingly engaging upper surface 34a of upper seal pad 34. Ramrod assembly 35 is illustrated extending to the side. Inlet 12 has coupling 12a threaded thereto. Outlet 14 has coupling 14a threaded thereto.

Figure 6:
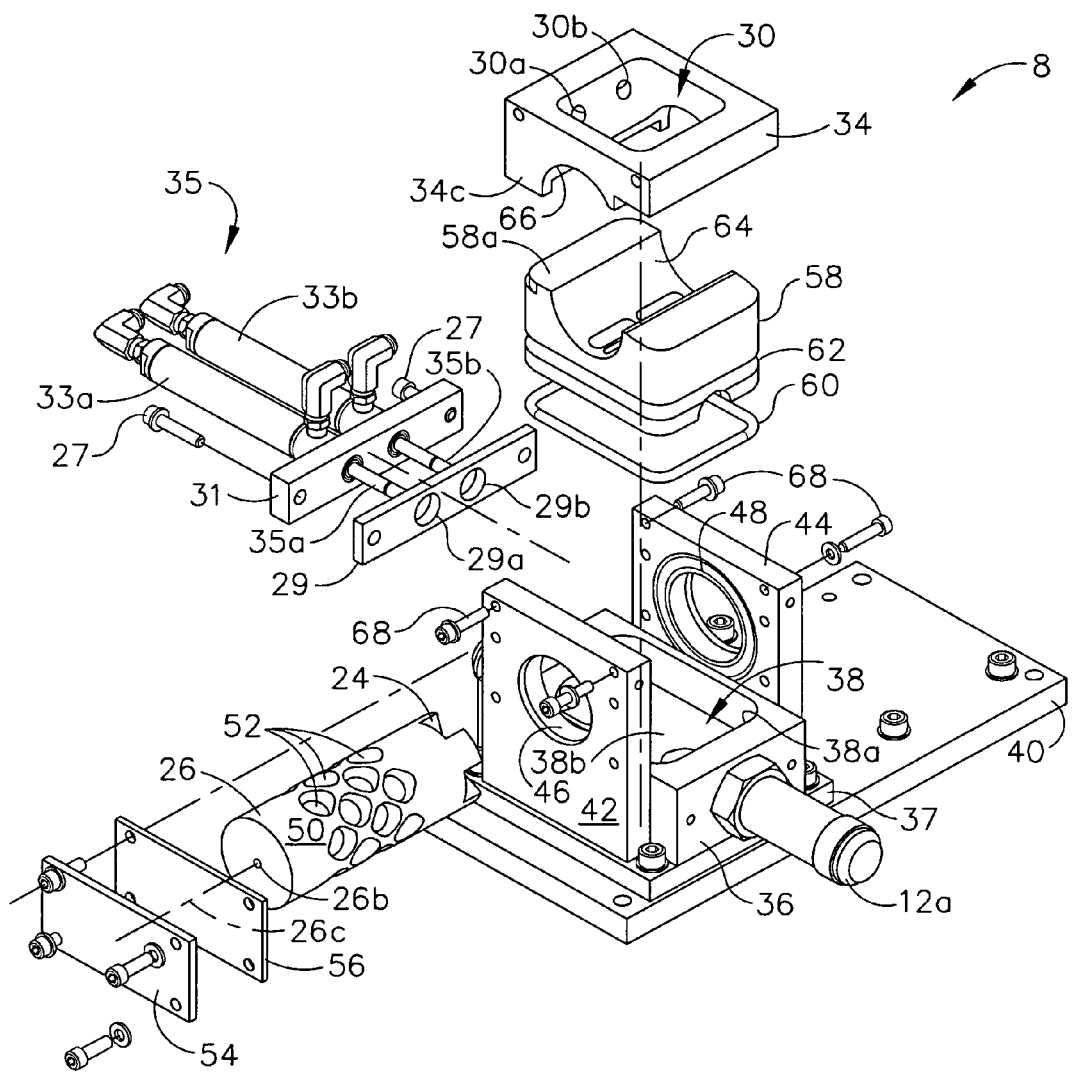
FIG. 6 is an exploded, perspective view of the feeder assembly.

FIG. 6 is an exploded perspective view of feeder 8. Feeder 8 includes feeder block 36 in which inlet 12 and outlet 14 are formed. Feeder block 36 includes cavity 38 defined by wall 38a and bottom 38b. Feeder block 36 is secured to plate 37 which is secured to base 40 which is secured to frame 4. A pair of spaced apart bearing supports 42, 44 respectively carry axially aligned sealed bearings 46, 48.

Rotor 26 is made from 6061 hard coat anodized aluminum, and is depicted as a cylinder, although various other shapes, such as frustoconical may be used. In the depicted embodiment, rotor 26 has a diameter of two inches. The present invention includes the use of a rotor having a diameter of approximately four inches. Threaded hole 26b is formed in the end of rotor 26 to provide for removal or rotor 26. Rotor 26 includes peripheral surface 50, in which a plurality of spaced apart pockets 52 are formed. In the embodiment shown, there are four circumferential rows of pockets 52, with each circumferential row having six pockets 52. Pockets 52 are also aligned in axial rows, with each axial row having two pockets 52. The axial and circumferential rows are arranged such that the axial and circumferential widths of pockets 52 overlap, but do not intersect, each other.

In this embodiment, rotor 26 is rotatably carried by bearings 46, 48, for rotation by motor 10 about rotor axis 26c. Rotor 26 is retained in place by motor 10 at end 26a, with thrust bearing plate 56 and retaining plate 54 retaining rotor 26 at the other end. Thrust bearing plate 56 is made of UHMW plastic. The fit between bearings 46, 48, and rotor 26 allows rotor 26 to be easily withdrawn from feeder assembly 8 by removing retaining plate 54 and thrust bearing plate 56, and sliding rotor out through bearing 46. A threaded shaft, such as a bolt, may be inserted into hole 26b to aid in removal of rotor 26.

In the embodiment depicted, the configuration of feeder 8 does not require any axial loading on rotor 26, either from sealing or the bearings. The end play or float of rotor 26 was about 0.050 inches.

Lower seal pad 58 is disposed partially in cavity 38, with seal 60, located in groove 62, sealingly engaging groove 62 and wall 38a. Lower seal pad 58 includes surface 64 which, when assembled, contacts peripheral surface 50 of rotor 26, forming a seal therewith, as described below. As used herein, "pad" is not used as limiting: "Seal pad" refers to any component which forms a seal.

Upper seal pad 34 includes surface 66 which, when assembled, contacts peripheral surface 50 of rotor 26. Fasteners 68 engage holes in upper seal pad 34 to hold it in place, without significant force being exerted by surface 66 on rotor 26. Intermediate seal 70 may be disposed between upper seal pad 34 and lower seal pad 58.

Upper seal pad 34 and lower seal pad 58 are made of a UHMW material. The ends of surfaces 64 and 66 adjacent bearing 46 are chamfered to allow easier insertion of rotor 26.

Ramrod assembly 35 includes two ramrods 35a and 35b which are moved between a retracted position to a position at which they extend into entrance 30 of feeder 8. Ramrods 35a and 35b are actuated by pneumatic cylinders 33a and 33b respectively, which are carried by mounting plate 31. Mounting plate 31 is secured at either end to bearing supports 42 and 44 by fasteners 27, with spacer 29 disposed adjacent mounting plate 31. Spacer 29 includes openings 29a and 29b which align with openings 30a and 30b in seal 34. Copending application Ser. No. 09/658,359 provides a description of the operation of ramrods. Any functional number of ramrods may be used, for example only one or more than two. They may be oriented differently than as shown in FIG. 6, such as at 90° to that illustrated, aligned with axis of rotation 26c. They may operate simultaneously, alternating or independently. They may be disposed at angles to each other.

Figure 7:
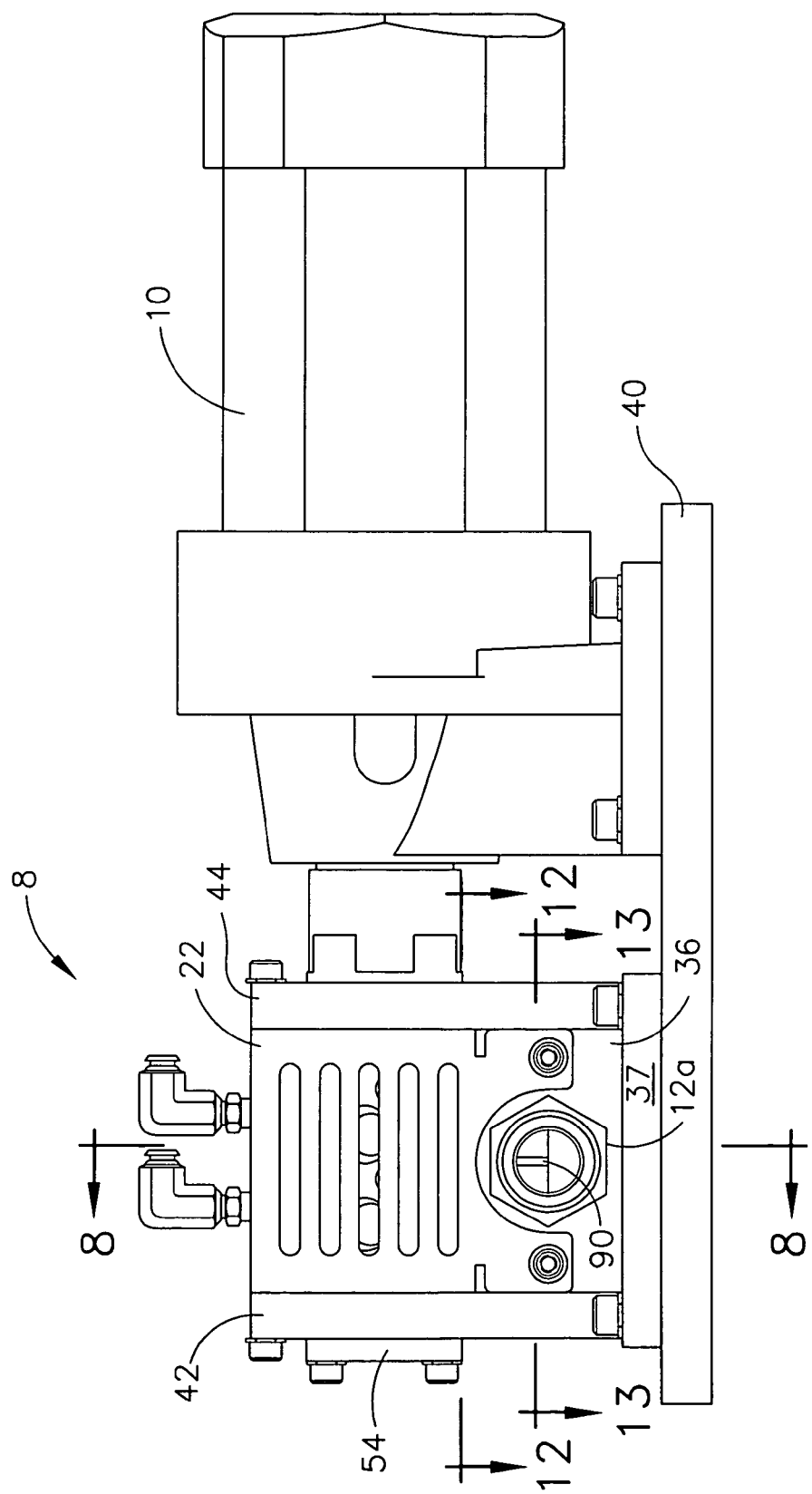
FIG. 7 is a side view of the feeder assembly and motor of FIG. 2.
Figure 8A:
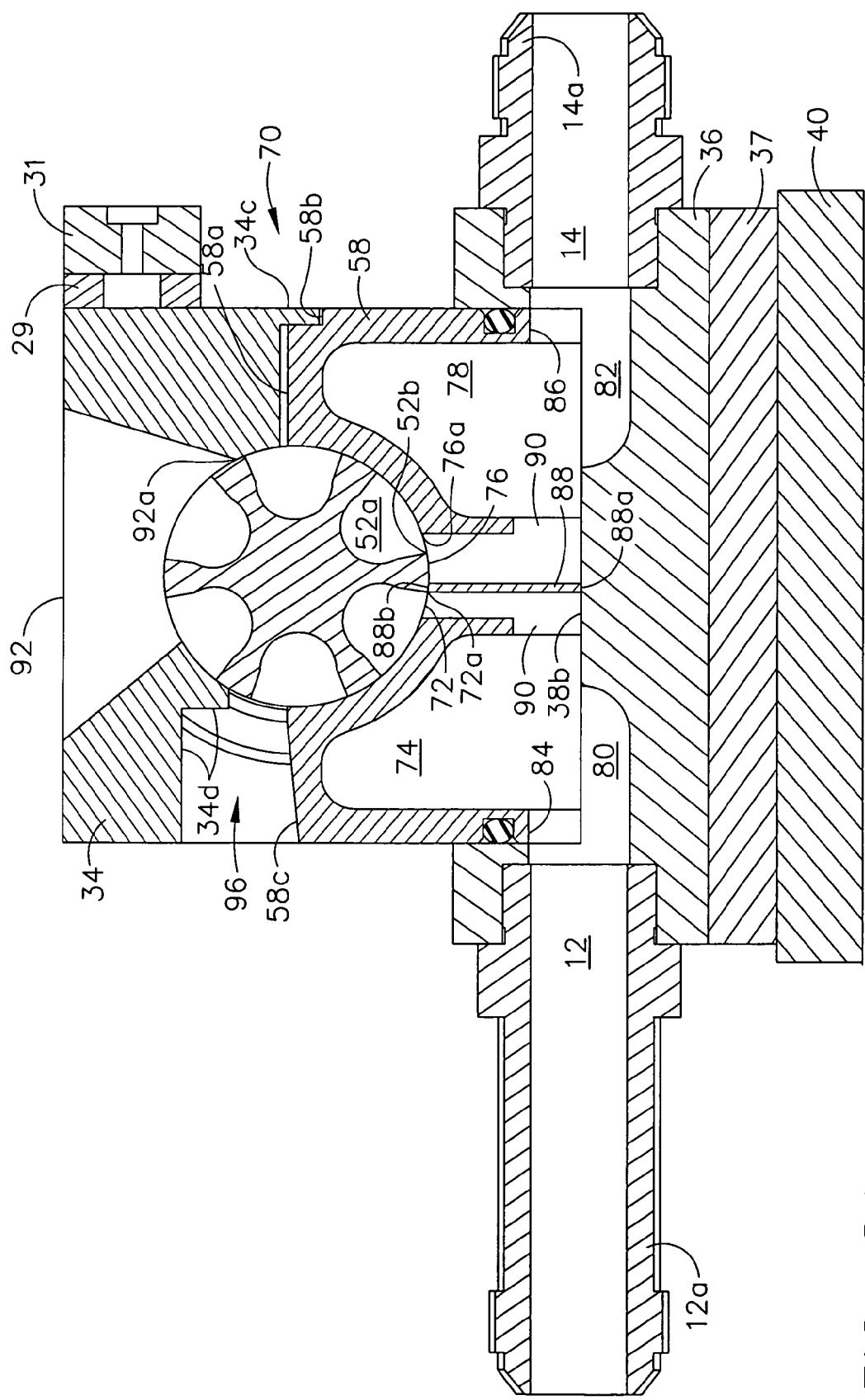
Figure 8B:
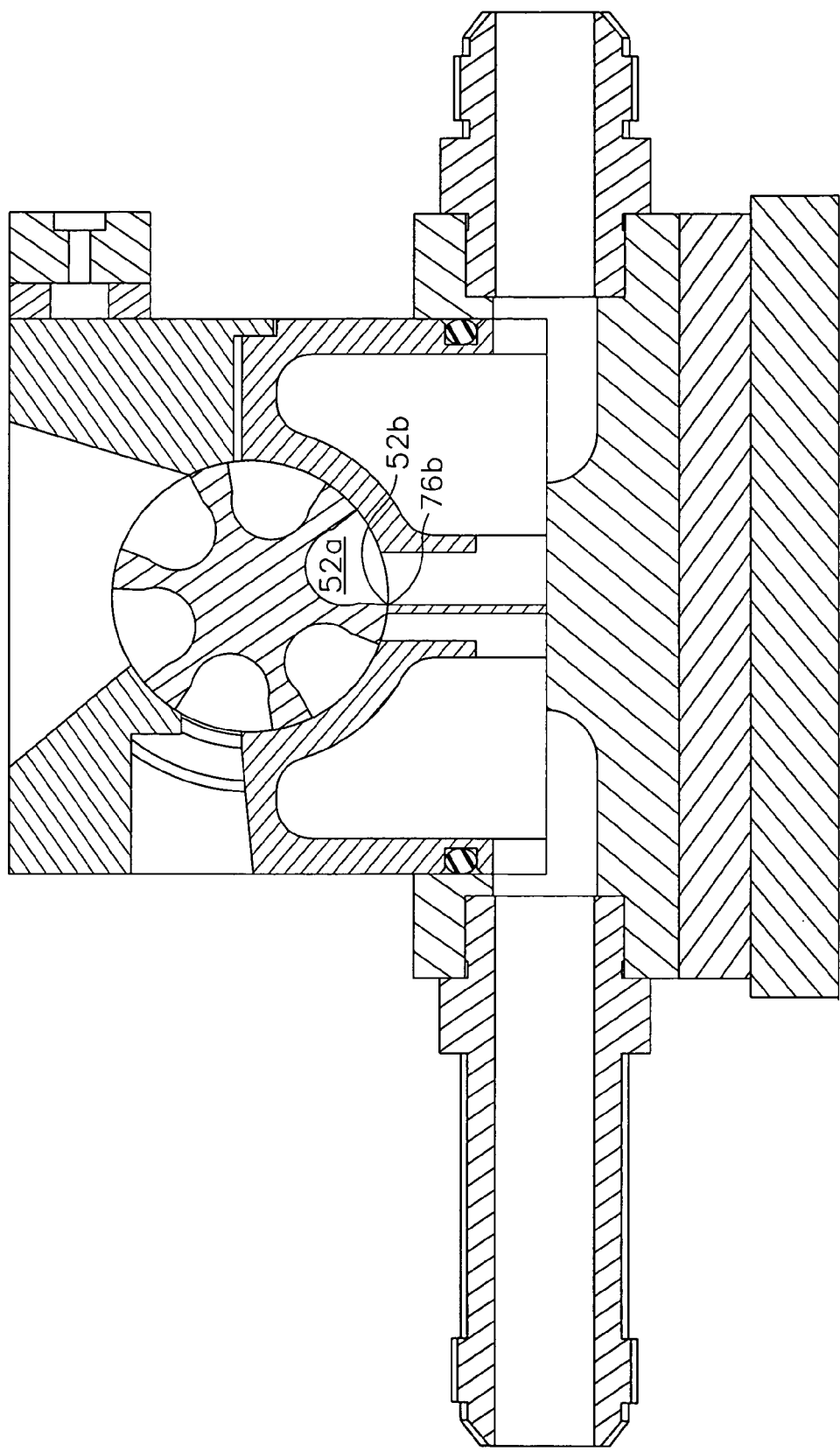
Figure 8C:
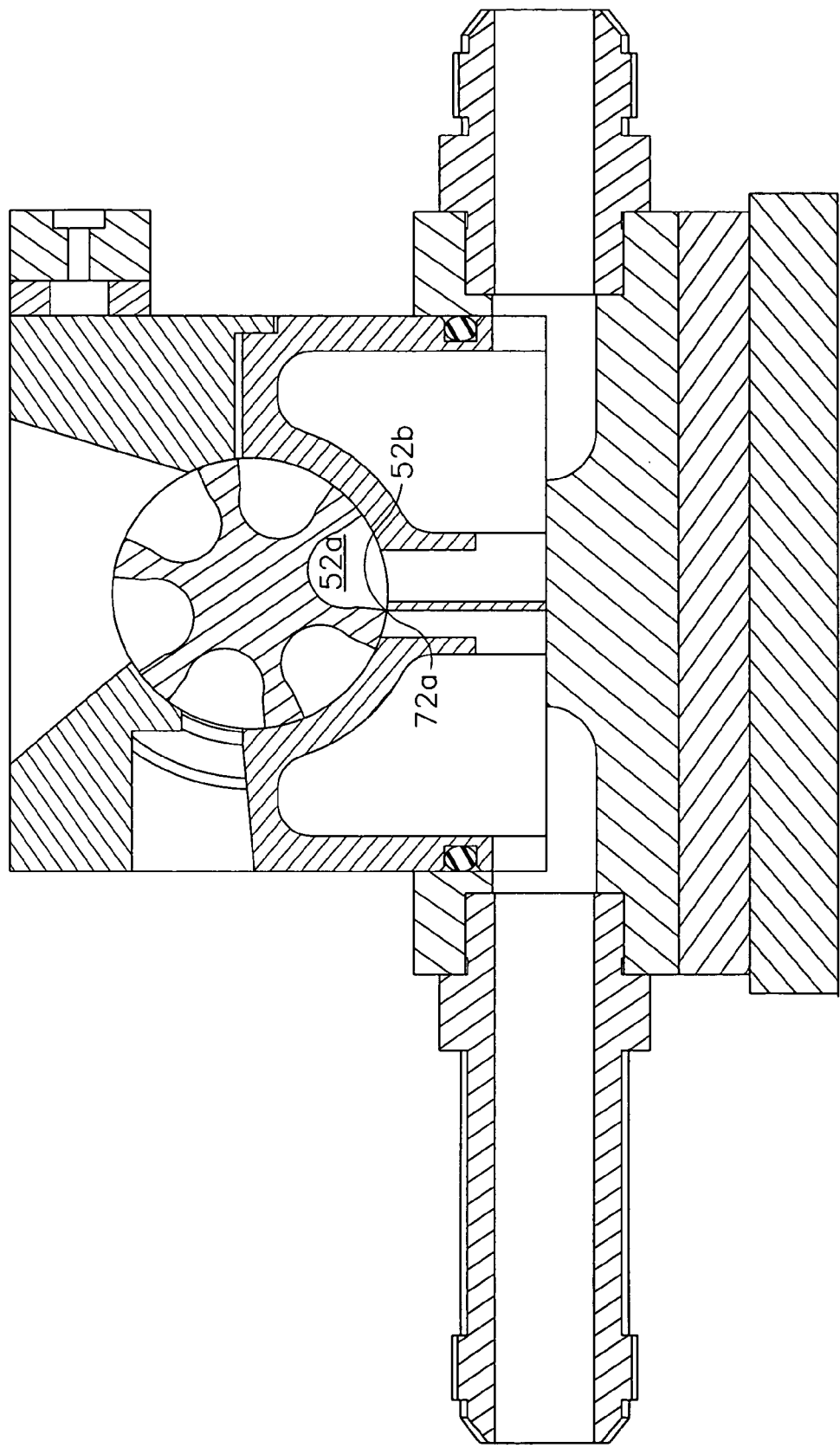
Figure 8D:
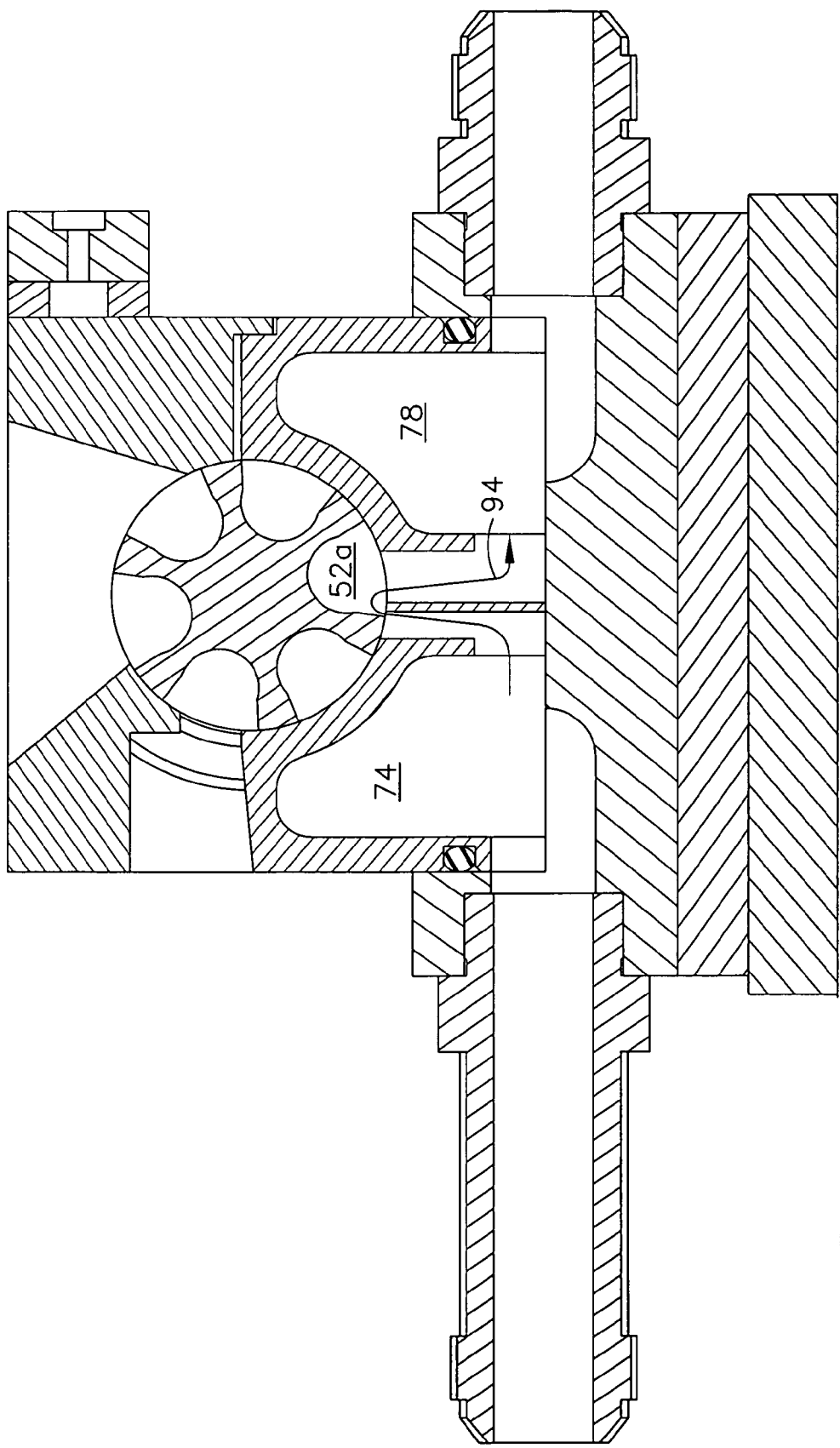
Figure 8E:
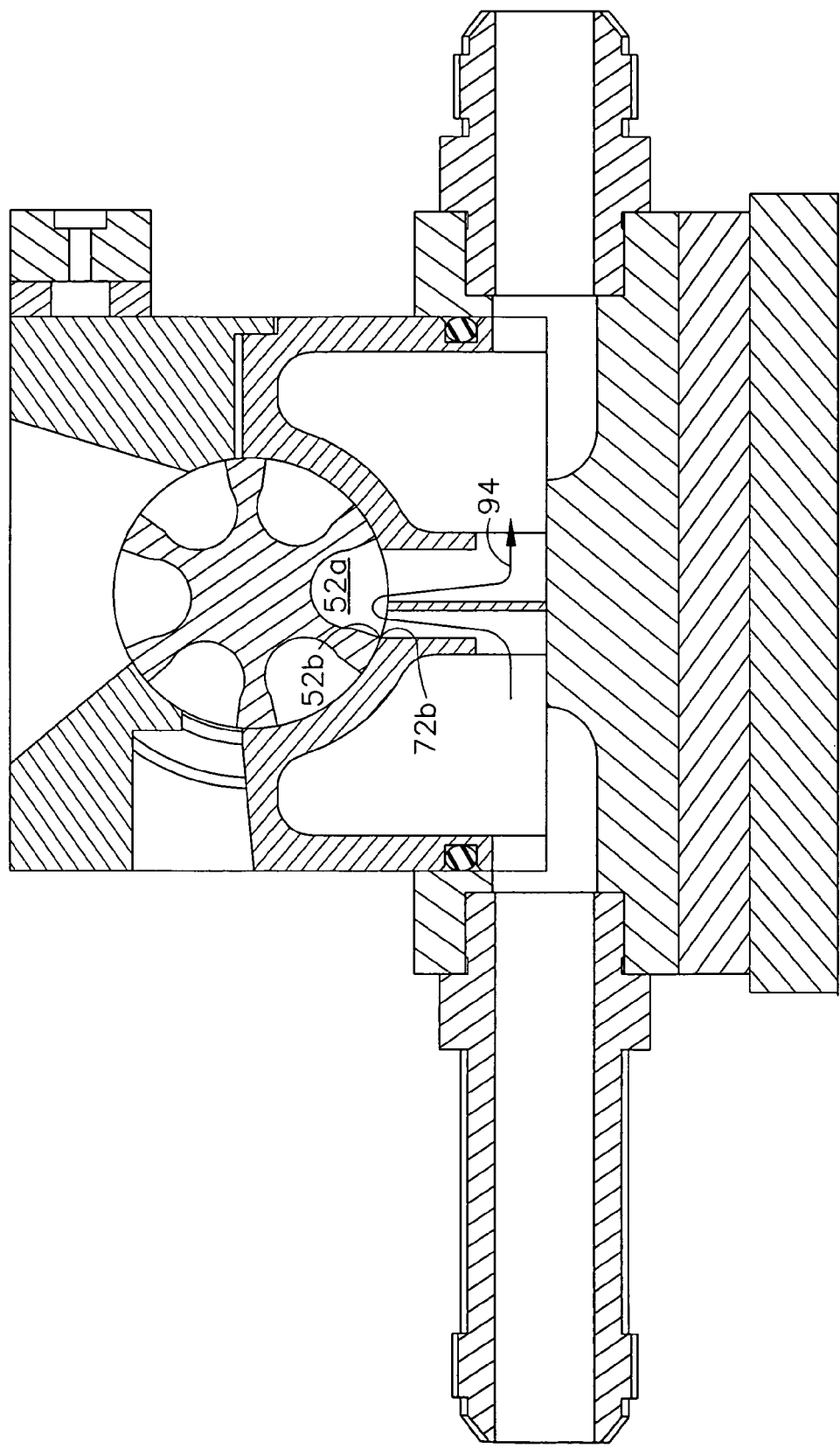
Figure 8F:
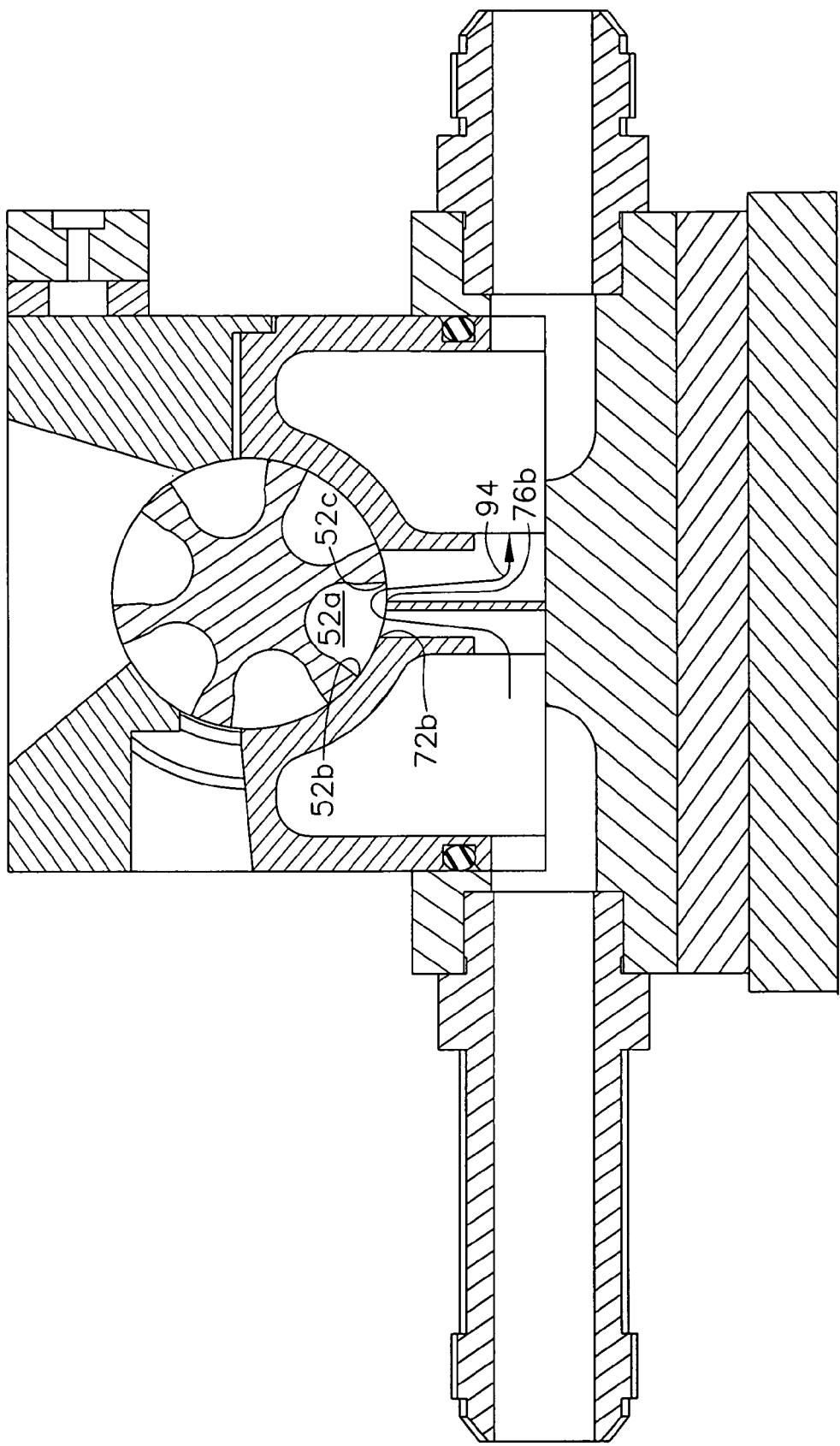
Figure 8G:
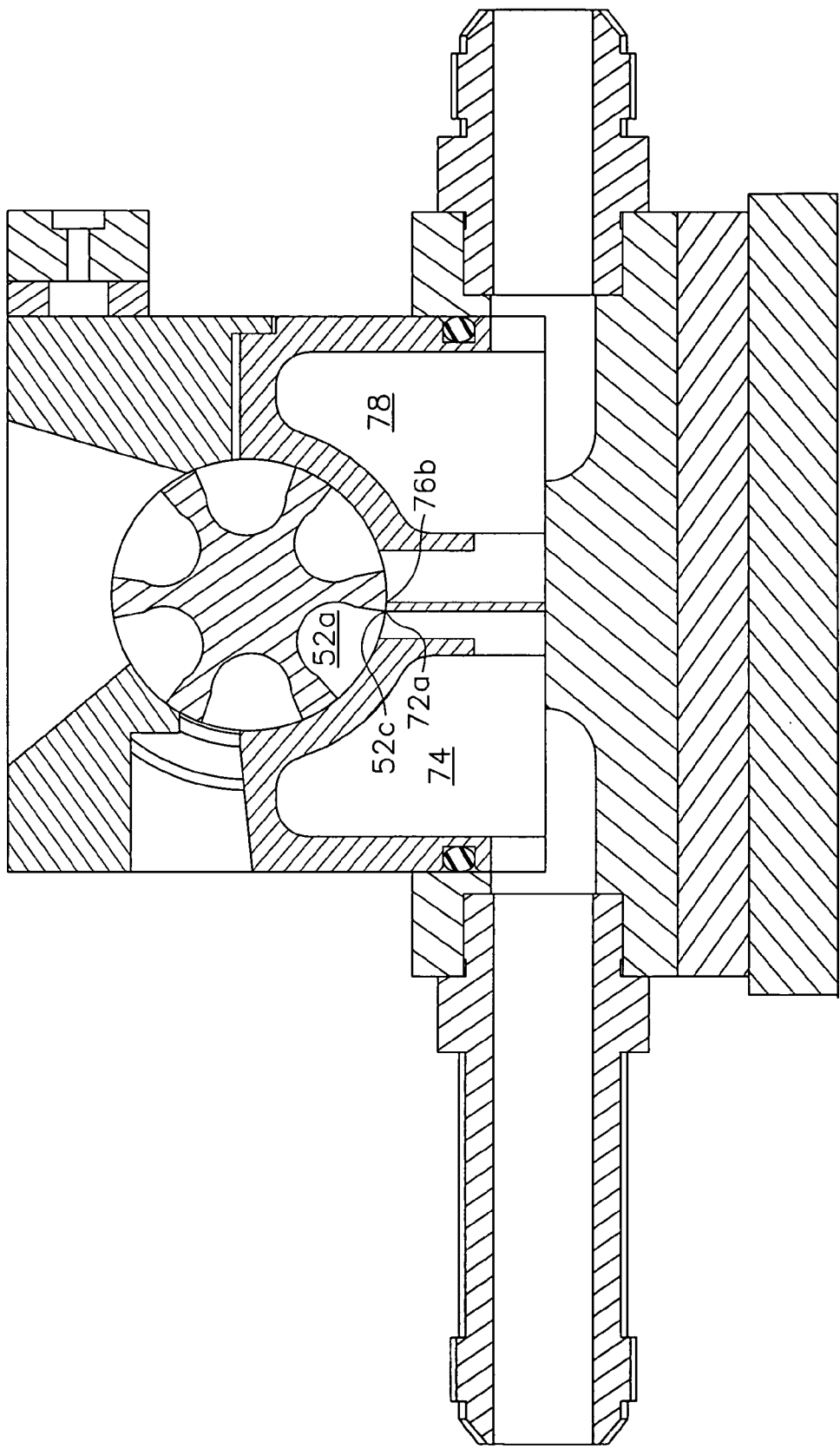
Figure 8H:
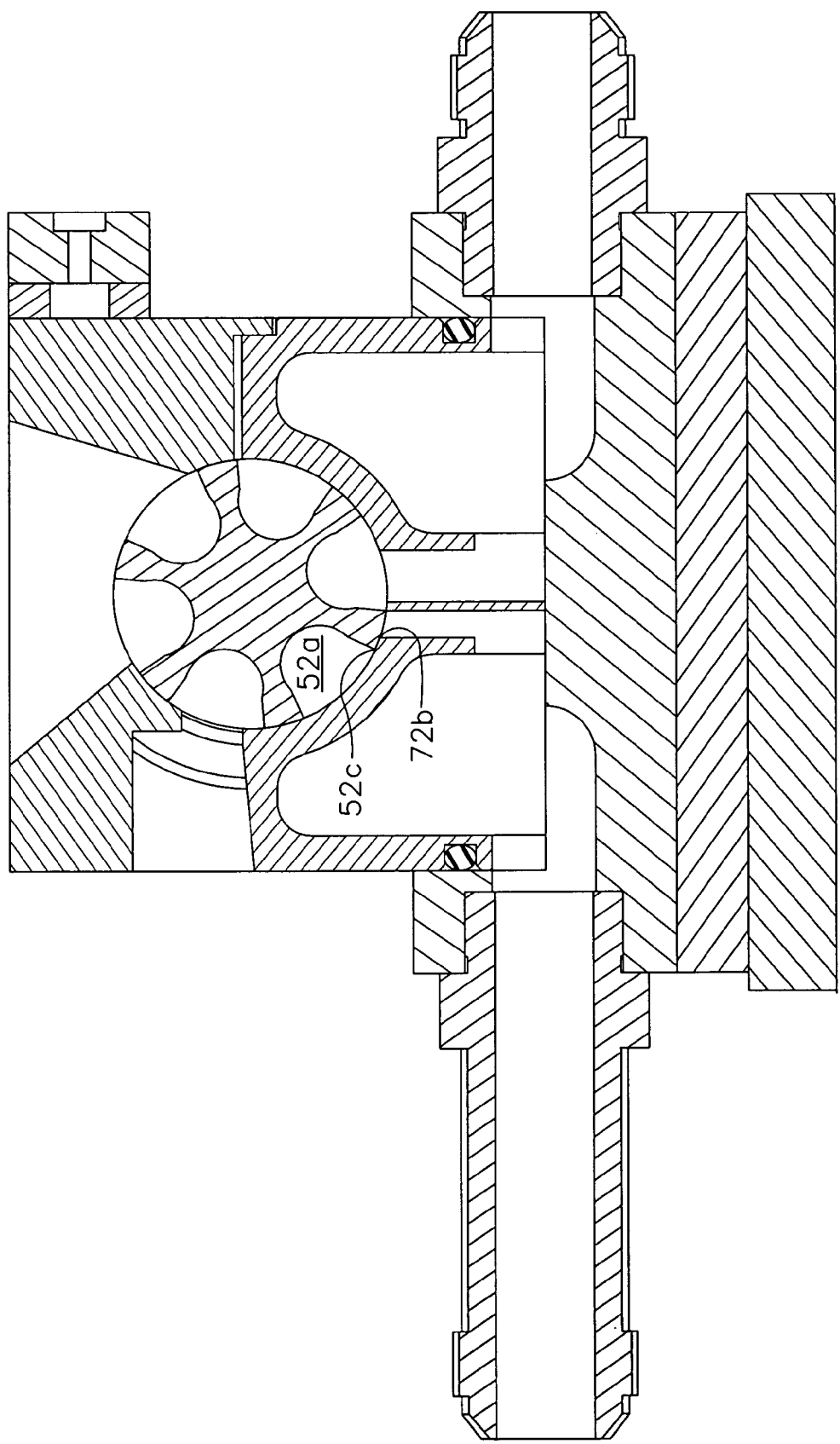
Figure 9:
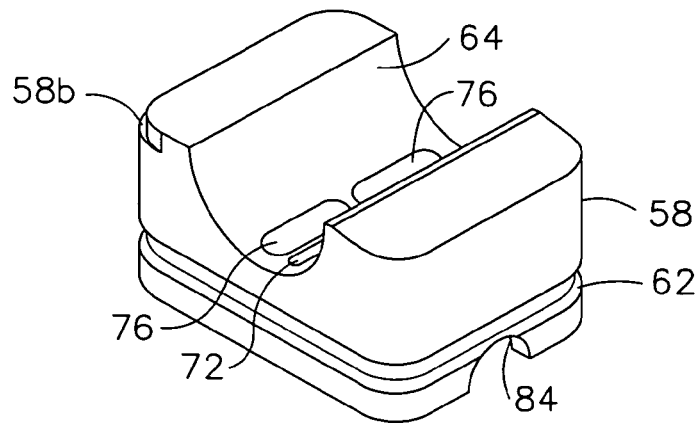
FIG. 9 is a perspective view of the lower pad of the feeder assembly.
Figure 10:
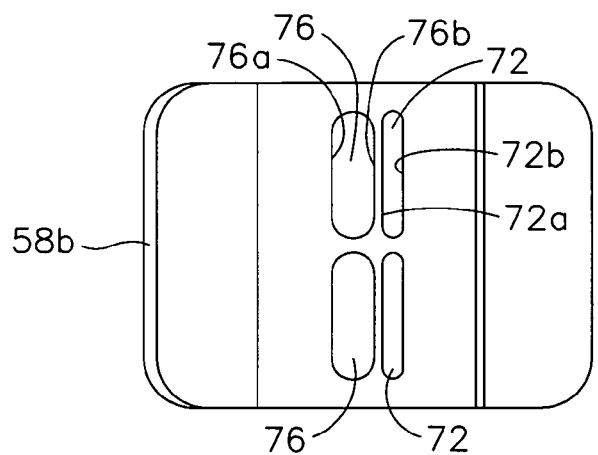
FIG. 10 is a top view of lower pad of FIG. 9.
Figure 11:
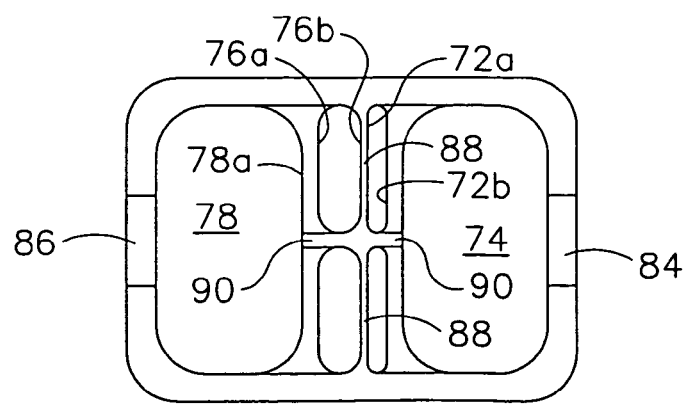
FIG. 11 is a bottom view of the lower pad of FIG. 9.
Figure 12:
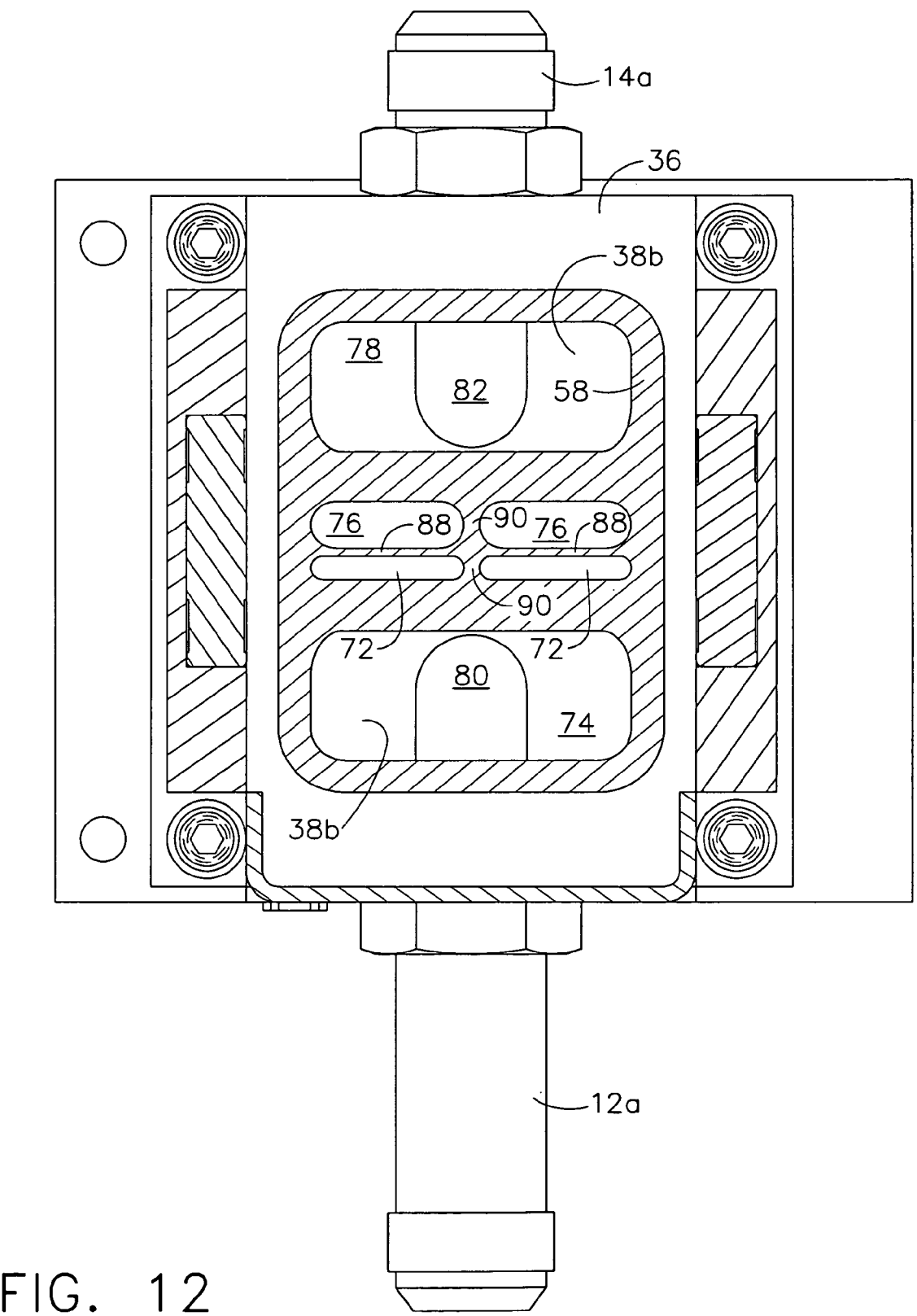
FIG. 12 is a cross-sectional view of the feeder assembly taken along line 12—12 of FIG. 7.
Figure 13:
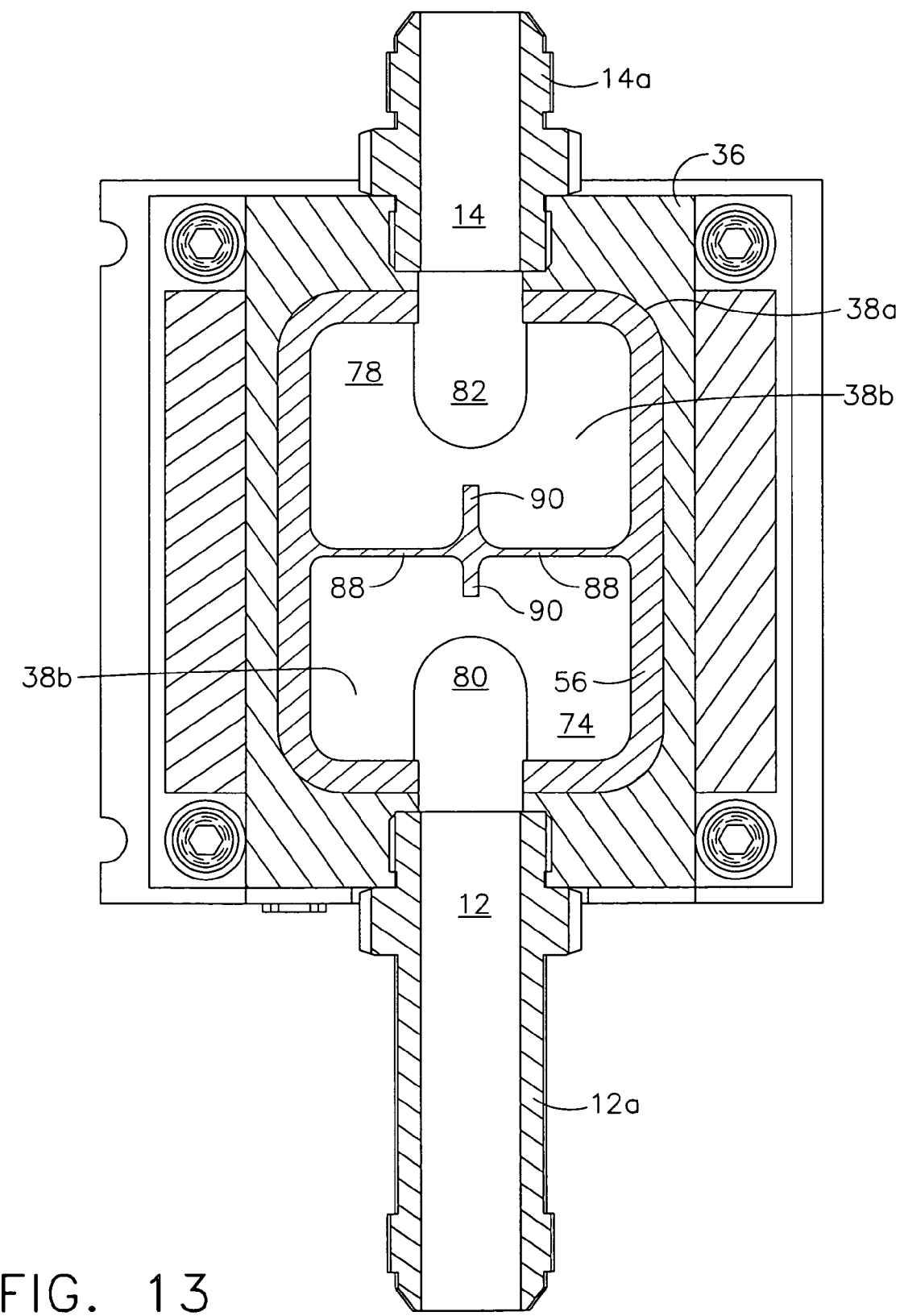
FIG. 13 is a cross-sectional view of the feeder assembly taken along line 13—13 of FIG. 7.
Figure 14:
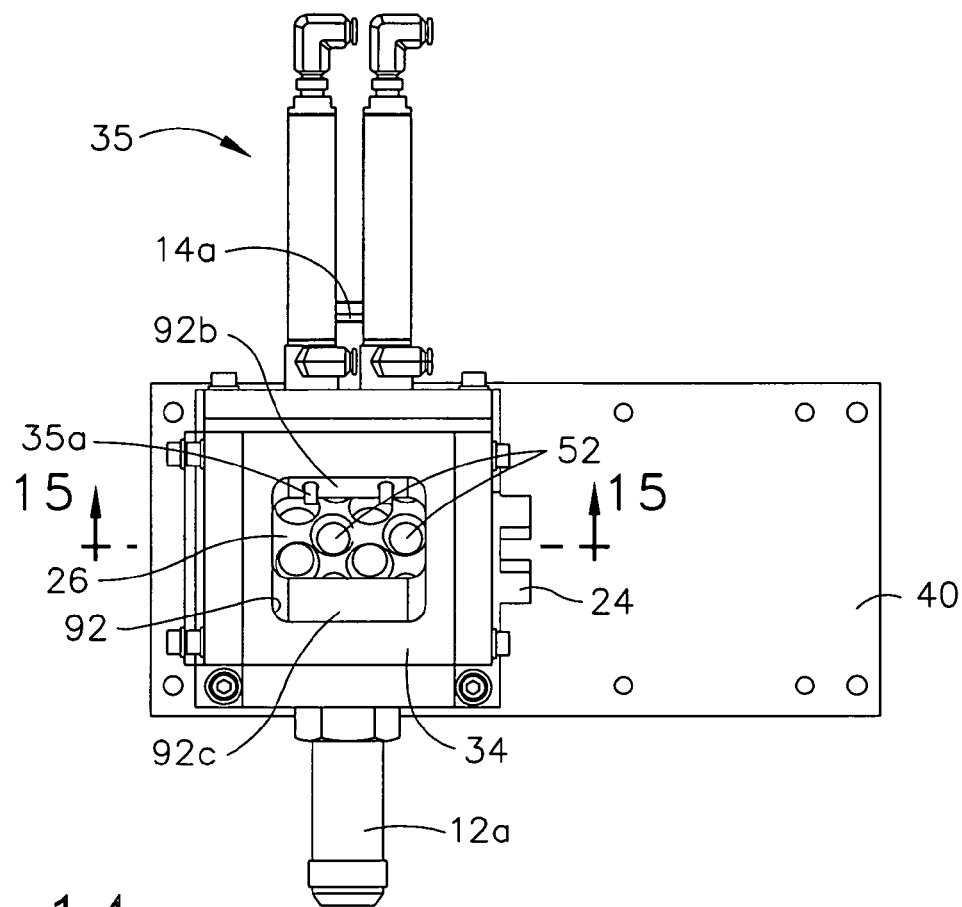
FIG. 14 is top view of the feeder assembly.
Figure 15:
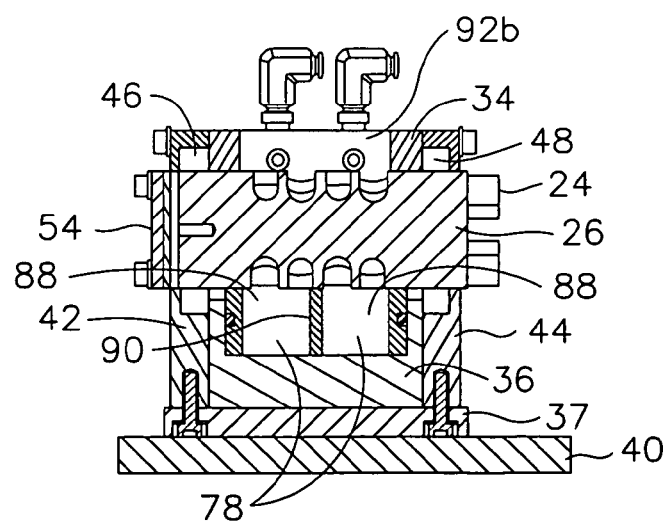
FIG. 15 is a is a cross-sectional view of the feeder assembly taken along line 15—15 of FIG. 14.
Figure 16:
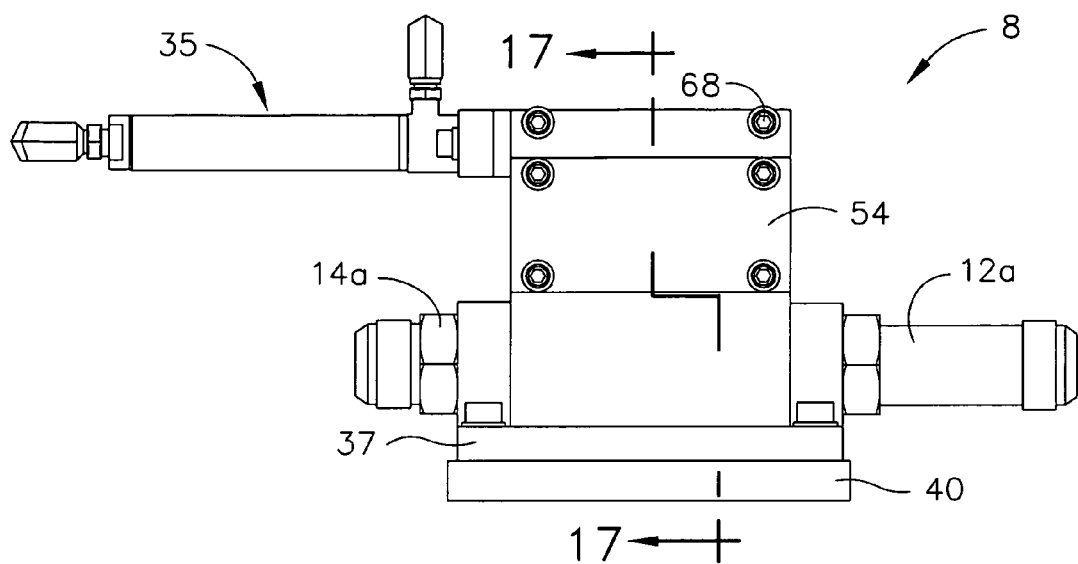
FIG. 16 is a side view of the feeder assembly.
Figure 17:
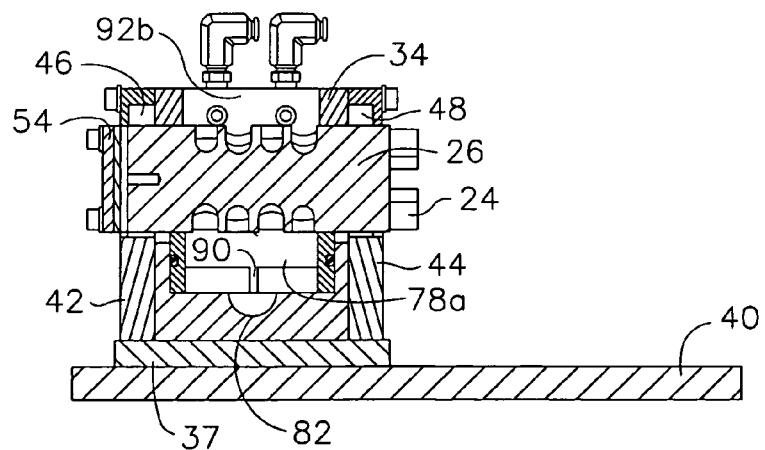
FIG. 17 is a cross-sectional view of the feeder assembly taken along line 17—17 of FIG. 16.
Figure 18:
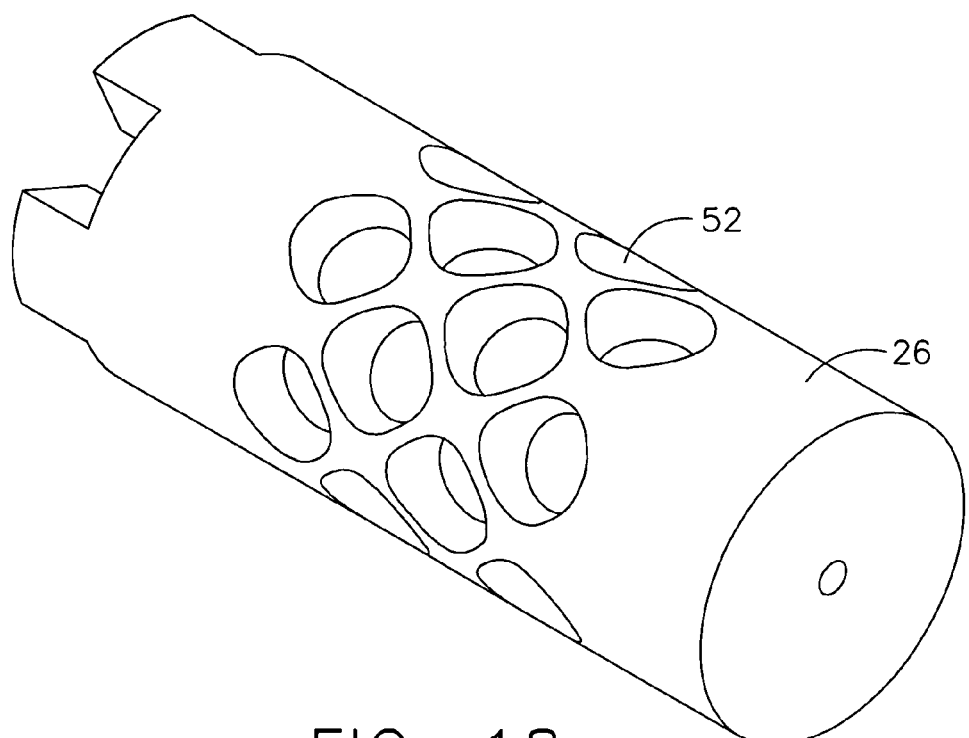
FIG. 18 is a perspective view of a rotor.
Figure 19:
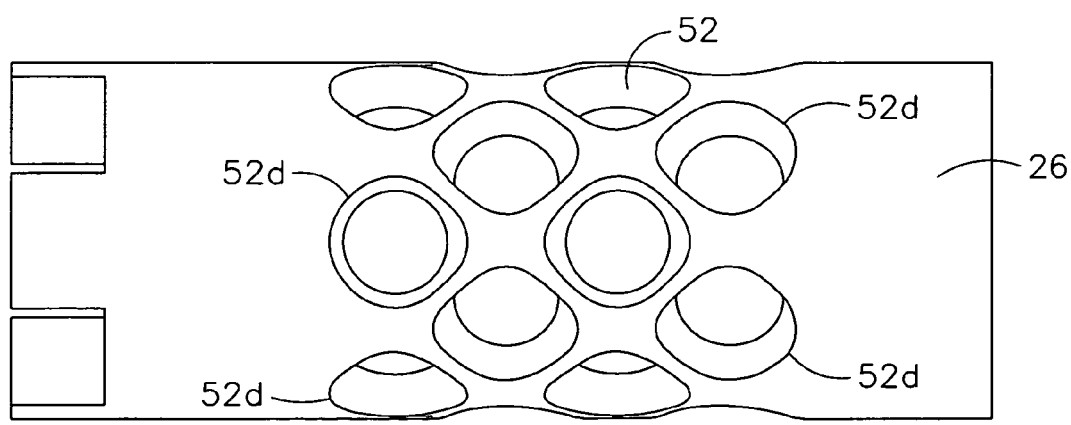
FIG. 19 is a side view of the rotor of FIG. 18.

FIGS. 8A–I are cross-sectional views of the feeder assembly taken along line 8—8 of FIG. 7, and show rotor 26 in successive rotational orientations. FIG. 8A shows lower pad seal 58 disposed in cavity 38, with seal 68 engaging wall 38a, and upper pad seal 34 overlying lower pad seal 58. Referring also to FIGS. 9–11, which show various views of lower seal pad 68, upper pad seal 34 is disposed adjacent upper surface 58a of lower pad seal 58. On one side, labyrinth seal 70 is formed between upper pad seal 34 and lower pad seal 58 by the cooperation of step 58b with downwardly extending wall or lip 34c. Thus, lower pad seal 58 overlaps with upper pad seal 34 at this stepped joint keeps ambient air from entering the hopper. With the stepped design, lower pad seal 58 can move vertically independent of upper pad seal 34, allowing substantially all force on lower seal pad 58 functions to urge surface 64 in sealing contact with surface 50, as described below. On the opposite side, vent 96 is formed, which allows pressurized transport gas to escape from pockets 52 as they pass thereby, as described below. Vent 96 is defined by step 34d formed in upper seal 34 and surface 58c a portion of which is downwardly inclined. The slight incline of a portion of surface 58c prevents water from puddling when water ice that may build up on the feeder thaws.

Surface 64 includes two openings 72 which are in fluid communication with inlet 12 through upstream chamber 74, and two openings 76 which are in fluid communication with outlet 14 through downstream chamber 78. It is noted that although two openings 72 and two openings 76 are present in the illustrated embodiment, the number of openings 72 and openings 76 may vary, depending on the design of feeder 8. For example, a single opening may be used for each. Additionally, more than two openings may be used for each.

Feeder 8 has a transport gas flowpath from inlet 12 to outlet 14. In the depicted embodiment, passageways 80 and 82 are formed in feeder block 36. Lower seal pad 58 includes recess 84, which is aligned with inlet 12 and together with passageway 80, places upstream chamber 74 in fluid communication with inlet 12. Lower seal pad also includes recess 86, which is aligned with outlet 14 and together with passageway 82, places downstream chamber 78 in fluid communication with outlet 14.

Upstream chamber 74 is separated from downstream chamber 76 by wall 88 which extends transversely across lower seal pad 58, in the same direction as axis of rotation 26c. Lower surface 88a of wall 88 seals against bottom 38b of cavity 38, keeping upstream chamber 74 separate from downstream chamber 78. Wall 90 is disposed perpendicular to wall 88, with lower surface 90a engaging bottom 38b.

As illustrated, in the depicted embodiment, inlet 12 is in fluid communication with outlet 14 only through individual pockets 52 as they are cyclically disposed by rotation of rotor 26 between a first position at an individual pocket first spans openings 72 and 76 and a second position at which the individual pocket last spans openings 72 and 76. This configuration directs all of the transport gas entering inlet 12 to pass through pockets 52, which pushes the blast media out of pockets 52, to become entrained in the transport gas flow. Turbulent flow occurs in downstream chamber 78, promoting mixing of media with the transport gas. Such mixing of the media minimizes entrains the media in the transport gas, minimizing impacts between the media and the feeder components downstream of the pockets. This means that the particles are only significantly in contact with the rotor, minimizing heat transfer to the particles from other components of feeder 8. The significant flow of the transport gas through each pocket 52 acts to effectively clean all media from each pocket 52.

For cryogenic particles, this transport gas flowpath, in which all or substantially all flows through pockets 52, aids in the transfer of heat from the transport gas to rotor 26, which helps reduce or prevent water ice (which forms due to humidity in the transport gas) from freezing on the rotor and other parts of feeder 8. Heat transfer between rotor 26 and non-moving components of feeder 8 is minimized by use of the UHMW pad seals surrounding rotor 26. Substantially all heat gain or loss of the rotor is from the particles and transport gas. The small mass of rotor 26 makes it easier for the transport gas to heat rotor 26. Additionally, rotor 26 could carry a heater element, or passageways could be provided for the flow of heated air primarily for heating rotor 26. Such passages could be in rotor 26. Of course, the necessary rotational coupling for such heater element or passageways would have to be provided.

Although the depicted embodiment is configured to direct all the transport gas through the pockets, is possible to configure a particle blast system to utilize this aspect of the present invention, but without directing all transport gas through the pockets, such as by bypassing a portion of the transport gas flow around the feeder, or even bypassing a portion of the transport gas flow around the pocket. The present invention is applicable to such particle blast systems.

FIGS. 8A–I illustrate the progress of pocket 52*a* past openings 76 and 72 as rotor 26 is rotated. In the depicted embodiment, rotor 26 rotates clockwise, presenting pockets 52 in an endless succession first past openings 76 and then openings 72 in a periodic, cyclical nature. It is noted that alternatively, rotor 26 could rotate in the opposition direction, exposing pockets first to openings 72 and then openings 76. Pockets 52 are filled with blast media, in particular in this embodiment carbon dioxide pellets, from hopper 6 through opening 92 in upper seal pad 34. The action of the small radius (e.g., in the depicted embodiment, four inches or less) of rotor 26 past opening edge 92*a* tends to bite into any agglomerated chunks of pellets, breaking them apart, reducing blockage and promoting more complete fill.

In FIG. 8A, leading edge 52*b* of pocket 52*a* is illustrated located about midway in opening 76. Once leading edge 52*b* has traveled past edge 76*a* of opening 76 a sufficient distance, pellets will begin to exit pocket 52*a*.

FIG. 8B illustrates leading edge 52*b* just reaching edge 76*b* of opening 76. At this position, the entire circumferential width of opening 76 is exposed to pocket 52*a*, it being noted that as a result of the roughly circular shape of the opening of pocket 52*a*, the cross-sectional area of the opening of pocket 52*a* exposed to opening 76 (as well as opening 72) varies with the angular position of pocket 52*a*.

At the position illustrated in FIG. 8B, transport gas cannot flow from inlet 12 to outlet 14 through pocket 52*a*, being blocked by sealing engagement between rotor 26 and edge 88*b* of wall 88. Because in the embodiment depicted, openings 72 and 76 are always spanned by at least two pockets 52, inlet 12 is always in fluid communication with outlet 14, but only through pockets 52.

Alternatively, the level of edge 88*b* could be reduced, creating a gap such that a complete seal with rotor 26 is not formed by wall 88, providing a continuous flowpath from inlet 12 to outlet 14 from the first passageway, defined by lower pad seal 58 which is in fluid communication with opening 72 to the second passageway, defined by lower pad seal 58 which is in fluid communication with opening 76, through the passageway defined by edge 88*b* of wall 88 and the peripheral surface 50 of rotor 26, not through pockets 52. Such a continuous flow path would reduce pulsing as the size of the flow path cyclically varies with the rotation of rotor 26. Of course, in such an embodiment, as pockets 52 are moved between the first and second positions, there is a substantial increase in the flowpath area, and a substantial volume of transport gas flows through the aligned pockets 52.

FIG. 8C illustrates leading edge 52*b* of pocket 52*a* at a first position just reaching edge 72*a* of opening 72, whereat pocket 52*a* first begins spanning opening 76 and 72. FIG. 8D illustrates rotor 26 rotated slightly further, with leading edge 52*b* just past edge 72*a*. Once leading edge 52*b* passes edge 76*a*, there is a continuous transport gas flowpath from opening 72 to opening 76 through pocket 52*a*. At the position shown in FIG. 8D, transport gas will flow from upstream chamber 74, through opening 72, pocket 52*a* and opening 76*a*, to downstream chamber 76, as indicated by arrow 94.

The transport gas pushes pellets from pocket 52*a* out opening 76, into downstream chamber 78 where mixing of the pellets and transport gas occurs, and pellets exit feeder 8 through outlet 14, entrained in the transport gas.

FIG. 8E illustrates leading edge 52*b* when it first reaches edge 72*b*. FIG. 8F shows leading edge 52*b* well past edge 72*b*, with trailing edge 52*c* approaching edge 76*b* at which the flowpath through pocket 52*a* will stop, the position at which pocket 52*a* is no longer part of the transport gas flowpath (until the next cycle).

FIG. 8G shows trailing edge 52*c* past edge 76*b*, at edge 72*a*. As can be seen, pocket 52*a* is no longer exposed to downstream chamber 78, but is exposed to pressurized transport gas. FIG. 8H illustrates trailing edge 52c past edge 72b, with pressurized transport gas trapped therein.

FIG. 8I illustrates pocket 52a rotated further, aligned with vent 96, which allows the pressurized transport gas that was trapped within pocket 52a to escape.

As previously mentioned, upper seal pad is held in engagement with rotor 26 by fasteners 68 without significant force being exerted by surface 66 on rotor 26. Ambient pressure is present within hopper 6. Upper seal pad 34 functions not only in the filling of pockets 52, but also to keep ambient moisture from entering the system through feeder 8. Adequate sealing is achieved between surface 66 and surface 50 without any significant force urging upper seal pad 34 toward rotor 26.

The seal between rotor surface 50 and lower seal pad surface 64 is very important. The pressurized transport gas must be contained, both for efficiency of the delivery of pellets to the blast nozzle and because leakage into the low pressure side of rotor 26 and into hopper 6 will cause agglomeration and other deleterious effects. The present invention utilizes the pressure of the transport gas to provide substantially all the sealing force between rotor surface 50 and seal surface 64.

When pressurized transport gas is not present (in the depicted embodiment, when transport gas is not flowing through the transport gas flowpath), there is no substantial force between rotor surface 50 and surface 64. When rotation of rotor 26 is started at the same or approximately the same time as transport gas is allowed to begin to flow (such as occurs in many particle blast systems when the blast trigger is depressed), there is no substantial force on rotor surface 50. This means that motor 10 does not have to be sized to start under load, which reduces the horsepower requirements, allowing a smaller, less expensive motor to be used. Rotor 26 will be very close to its steady state speed by the time the transport gas pressure results in substantial sealing force on rotor surface 50.

Referring to FIG. 8I for clarity of explanation, as described above, lower seal pad 58 is disposed partially in cavity 38, with seal 68 sealing between wall 38a and lower seal pad 58. Surface 98 is spaced apart from surface 64, and together they define arcuate wall 100. Although walls 88 and 90 extend from arcuate wall 100, arcuate wall 100 is a relatively thin wall which is sufficiently flexible to transmit a substantial portion of pressure exerted against surface 98 to rotor surface 50 by surface 64. Surface 98a of surface 98 defines a portion of upstream chamber 74. When transport gas is flowing through the transport gas flowpath, the pressure of the transport gas within upstream chamber 74 bears on surface 98a, urging the overlying portion surface 64a of surface 64 against rotor surface 50. The flexibility of arcuate wall 100a allows arcuate wall to conform to the shape of rotor surface 50, and transmit a substantial portion of the pressure to surface 64a, urging surface 64a into sealing contact with rotor surface 50.

Similarly, surface 98b of surface 98 defines a portion of downstream chamber 76. When transport gas is flowing through the transport gas flowpath, the pressure of the transport gas within downstream chamber 76 bears on surface 98b, urging the overlying portion surface 64b of surface 64 against rotor surface 50. The flexibility of arcuate wall 100b allows arcuate wall to conform to the shape of rotor surface 50, and transmit a substantial portion of the pressure to surface 64b, urging surface 64b into sealing contact with rotor surface 50.

In the illustrated embodiment, seal surface 64 contacts rotor surface 50 over an angle of about 180°. The depicted configuration allows the sealing force to be exerted throughout substantially the entire contact angle, and substantially normal to rotor surface 50. Of course other seal arrangements, even those that are not activated by gas pressure, may also be used with the pockets being part of the transportation gas flowpath.

It is noted that as the pressure of the transport gas increases, the required sealing force between rotor surface 50 and surface 64 increases. In the depicted embodiment, the sealing force between rotor surface 50 and surface 64 is proportional to the transport gas pressure. In turn, the load on rotor 26 and motor 10 is proportional to the transport gas pressure. This reduces rotor and seal wear, and increases motor life.

Although in the depicted embodiment it is the gas pressure of the transport gas within the transport gas flowpath which urges surface 64 against rotor surface 50, the pressure which actuates the seal against rotor surface 50 may come from any source. For example, inner surface 98 may be exposed to pressurized transport gas by a chamber or passageway connected to but not within the direct transport gas flowpath. The pressure of the gas within such a chamber or passageway may be controlled separate from the pressure of the transport gas. The chamber may be not connected to the transport gas flowpath, with a separate source of fluid pressure being used to urge surface 64 into sealing engagement with rotor surface 50.

Configurations other than as depicted in the illustrated embodiment may be used to provide the sealing force. For example, a plurality of internal passageways may be formed adjacent surface 64 which urge surface 64 into sealing engagement with rotor surface 50 when pressure is present in such internal passageways. It is noted that the dynamic pneumatically actuated seal unloads rotor 26 when not in operation, make rotor removal easier than designs that require seals be unloaded before rotor removal.

It is noted that only one circumferential row of pockets 52 is visible in FIGS. 8A–I. In the depicted embodiment, there is an additional circumferential row of pockets 52 which is axially aligned with the depicted row, and two other circumferential rows of pockets 52 which aligned with each other but staggered with respect to the other two aligned circumferential rows. Thus, in the depicted embodiment, there are always at least two pockets 52 exposed to both openings 72 and 76, allowing the transport gas to flow continuously from upstream chamber 74 to downstream chamber 76. The arrangement of pockets 52 in the depicted embodiment thus keeps inlet 12 in continuous fluid communication with outlet 14. The depicted configuration, including the arrangement of pockets 52, the flow through pocket, and downstream mixing chamber 78, functions to reduce pulsing of blast media.

The shape and depth of pockets 52 may vary. Obviously, sufficient wall thickness must remain between pockets 52 to maintain structural integrity and sufficient sealing at surface 50. Different pocket opening shapes may be used. It is noted that openings with leading edges that are parallel to edges 72a, 72b, 76a and 76b, and/or too much axial width can allow deflection in surfaces 64, as well as 66, resulting in the pocket opening gouging those surfaces. In the depicted embodiment, the volume of pockets 52 was as large as possible, given the physical constraints, so as to maximize the volume for receiving and transporting pellets. In the depicted embodiment, laminar flow does not occur through pockets 5, promoting better removal of pellets as the transport gas flows therethrough.

The size and number of pockets 52, as well as rotational speed of rotor 26, determine how much blast media can be introduced into the transport gas flow and ultimately how much blast media can be directed toward a target from the blast nozzle. Rotor 26 is substantially smaller in diameter than other radial transport rotors, being in the depicted embodiment about two inches in diameter. The smaller diameter results in less torque developed by the seal pressure. This, in addition to the lack of significant seal drag at start up, allows a smaller motor to be used. The small diameter rotor also has a lower moment of inertia, which also reduces the power required for rotation. In contrast, prior art motors were at least one horsepower. In the depicted embodiment, for the same pellet delivery rate, motor 10 is can be a half or quarter horsepower motor, perhaps even lower. This lower torque requirement allows, if desired, the use of a pneumatic motor.

The rotational speed of rotor 26 in the depicted embodiment is 70 RPM, compared to 20 RPM of similar prior art large diameter rotors. For the depicted arrangement of pockets 52, this speed results in the same rate of pocket exposure at the discharge station as the slower moving, larger diameter rotors of the prior art. If the large diameter prior art rotors rotated too fast, the pockets would not fill, similar to cavitation resulting from the characteristics of the pellets, meaning that rotating the rotor above a certain speed would not increase the pellet delivery rate. However, the small diameter rotor, one aspect of the present invention, is able to fill properly even when rotated at the higher rotational speed.

By keeping the rate of pocket exposure, based on diameter, rotational speed and pocket opening, at approximately the same as larger prior art rotors, the smaller diameter rotor is used as described herein. The volume of pocket exposure is also important. The smaller rotor dictates deeper pockets and more pockets to obtain the same volume. Filling the deeper pockets requires more time than shallow pockets of the same volume, thereby affecting rotational speed. For example, in one embodiment, a 14% deeper pocket depth was combined with a 14% drop in rotational speed of the small rotor of the equivalent small rotor rate of pocket exposure.

Additional benefit is obtained by the increased speed, reducing the time that pellets spend in a given pocket, thereby reducing the time that the pellets can cool the rotor. In the configuration shown, with oppositely aligned charge and discharge stations, pellets are in a rotor pocket for approximately half of each rotation. The “dwell” time for pellets in a pocket are the same for the same rate of pocket exposure, regardless of rotor diameter. However, the small diameter rotor reduces the total variation in temperature by reducing cycle time.

Different ranges of delivery rates may be achieved by providing a variety of rotors having different pocket arrangements, such as pockets of different sizes or a different number of pockets. The rotor rotational speed can then be varied to control the exact delivery rate within the range. However, the control system may provide only a single rotor speed. Rotors may be easily changed by removal of retaining plate 54, as discussed above.

Referring to FIG. 12, there is shown a cross-sectional view taken along line 12—12 of FIG. 7, showing a section through lower seal pad 58. FIG. 13 is a cross-sectional view taken along line 13—13 of FIG. 7, showing a section through lower seal pad 58 at a location closer to bottom 38*b* of feeder block 36. Passageways 80 and 82 can be seen, formed in bottom 38*b*.

FIG. 14 is a top view of feeder 8, with plurality of pockets 52 of rotor 26 clearly visible through opening 92. Inclined surfaces 92*b* and 92*c* allow opening to be larger than the opening 92 adjacent rotor 26. It is noted that the width (as taken parallel to section line 15—15) of opening 92 is larger than similar prior art feeders, with the ratio of length to diameter of rotor 26 being substantially larger than that of prior art feeders.

FIG. 15 is a cross-sectional view taken along line 15—15 of FIG. 14. Section line 15—15 cuts through downstream chamber 78 so that wall 88 is seen in fall view and wall 90 is seen in section view.

FIG. 16 is a side view of feeder 8, and FIG. 17 is a cross-sectional view taken along line 17—17 of FIG. 16. FIGS. 15 and 17 are similar in that the section is taken through the center of rotor 26. However, in FIG. 17, the lower portion of the section is taken closer to outlet 14, showing surface 78*a* of downstream chamber 78 and wall 90 in full view.

Any suitable shape for pockets 52 may be used. FIGS. 18 and 19 provide further illustration of pockets 52 of the rotor depicted herein. The mouth of the pockets, at surface 50 of rotor 26, have been enlarged relative to the rest of the pocket. Due to the cylindrical shape of rotor 26, the wall thickness between adjacent pockets 52 is smaller closer to the rotor’s center. In contrast, at surface 50, the pocket centers are further apart, allowing the pocket openings to be larger. It is noted that in the depicted embodiment the outside edges 52*d* of either outer circumferential row of pockets 52 are not the same shape as the pocket openings of the inner two circumferential rows. This matches existing hopper throat size, but it will be recognized that such an opening configuration is a limitation.

The present invention allows the utilization of a rotor having a diameter to width (sealing width) of below 1:1, such as in the depicted embodiment 1:2. Prior art rotors operating at pressures in the range of 30–300 PSIG, such as is typically found with cryogenic particle blasting, are known to fall around 8:1.25.

The foregoing description of an embodiment of the invention has been presented for purposes of illustration and description. It is not intended to be exhaustive or to limit the invention to the precise form disclosed. Obvious modifications or variations are possible in light of the above teachings. The embodiment was chosen and described in order to illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A feeder configured to transport blast media from a source into a flow of transport gas, said feeder comprising:

a) a rotor having a circumferential surface, said rotor being rotatable about an axis of rotation;

b) a plurality of pockets disposed in said circumferential surface, each of said plurality of pockets being cyclically disposed between a first position and a second position when said rotor is rotated about said axis;

c) a transport gas flowpath, said transport gas flowpath having an inlet and an outlet, said inlet being configured to be connected to a source of transport gas;

d) a seal having a first surface contacting at least a portion of said circumferential surface, said first surface having at least one first opening and at least one second opening spaced apart from each other, said at least one first opening being in fluid communication with said inlet, said at least one second opening being in fluid communication with said outlet; and e) said transport gas being able to flow from said at least one first opening to said at least one second opening through those of said plurality of pockets disposed between said first and second positions.

2. The feeder of claim 1, wherein said seal includes a downstream chamber, said at least one second opening being in fluid communication with said outlet through said downstream chamber.

3. The feeder of claim 2, wherein a wall is defined by said first surface and a second, spaced apart surface, said wall being sufficiently flexible to transmit a substantial portion of pressure exerted against said second surface by transport gas present within said downstream chamber to said circumferential surface by said first surface when transport gas is flowing through said transport gas flowpath.

4. The feeder of claim 1, wherein said seal includes an upstream chamber, said at least one first opening being in fluid communication with said inlet through said upstream chamber.

5. The feeder of claim 4, wherein a wall is defined by said first surface and a second, spaced apart surface, said wall being sufficiently flexible to transmit a substantial portion of pressure exerted against said second surface by transport gas present within said upstream chamber to said circumferential surface by said first surface when transport gas is flowing through said transport gas flowpath.

6. The feeder of claim 1, wherein there is no substantial force between said circumferential surface and said first surface when transport gas is not flowing through said transport gas flowpath.

7. The feeder of claim 1, wherein said first surface is urged into sealing contact with said circumferential surface when transport gas is flowing through said transport gas flowpath.

8. The feeder of claim 7, wherein substantially all sealing force between said first surface and said circumferential surface is created by said transport gas flowing through said transport gas flowpath.

9. The feeder of claim 1, wherein a wall is defined by said first surface and a second spaced apart surface, said wall being sufficiently flexible to transmit a substantial portion of pressure exerted against said second surface by transport gas to said circumferential surface by said first surface when transport gas is flowing through said transport gas flowpath.

10. The feeder of claim 1, wherein said transport gas is able to flow from said at least one first opening to said at least one second opening only through those of said plurality of pockets disposed between said first and second positions.

11. The feeder of claim 1, wherein a portion of said transport gas does not flow through said first and second openings.

12. The feeder of claim 1, comprising a passageway defined at least partially by said seal, a portion of transport gas being able to flow from said at least one first opening to said at least one second opening through said first passageway.

13. The feeder of claim 1, wherein said plurality of pockets are arranged such that said transport gas is able to flow continuously from said at least one first opening to said at least one second opening when said rotor is rotated.

14. The feeder of claim 1, wherein said wall contacts said circumferential surface over an angle of about 180°.

15. The feeder of claim 1, wherein said seal is of unitary construction.

16. A particle blast system comprising:

a) a source of blast media;

b) a discharge nozzle for expelling blast media from said system; and c) a feeder configured to transport blast media from said source into a flow of transport gas, said feeder assembly comprising:

i) a rotor having a circumferential surface, said rotor being rotatable about an axis of rotation;

ii) a plurality of pockets disposed in said circumferential surface, each of said plurality of pockets being cyclically disposed between a first position and a second position when said rotor is rotated about said axis;

iii) a transport gas flowpath, said transport gas flowpath having an inlet and an outlet, said inlet being configured to be connected to a source of transport gas;

iv) a seal having a first surface contacting at least a portion of said circumferential surface, said first surface having at least one first opening and at least one second opening spaced apart from each other, said at least one first opening being in fluid communication with said inlet, said at least one second opening being in fluid communication with said outlet; and v) said transport gas being able to flow from said at least one first opening to said at least one second opening through those of said plurality of pockets disposed between said first and second positions.

17. The particle blast system of claim 16, wherein said seal includes a downstream chamber, said at least one second opening being in fluid communication with said outlet through said downstream chamber.

18. The particle blast system of claim 17, wherein a wall is defined by said first surface and a second, spaced apart surface, said wall being sufficiently flexible to transmit a substantial portion of pressure exerted against said second surface by transport gas present within said downstream chamber to said circumferential surface by said first surface when transport gas is flowing through said transport gas flowpath.

19. The particle blast system of claim 16, wherein said seal includes an upstream chamber, said at least one first opening being in fluid communication with said inlet through said upstream chamber.

20. The particle blast system of claim 19, wherein a wall is defined by said first surface and a second, spaced apart surface, said wall being sufficiently flexible to transmit a substantial portion of pressure exerted against said second surface by transport gas present within said upstream chamber to said circumferential surface by said first surface when transport gas is flowing through said transport gas flowpath.

21. The particle blast system of claim 16, wherein there is no substantial force between said circumferential surface and said first surface when transport gas is not flowing through said transport gas flowpath.

22. The particle blast system of claim 16, wherein said first surface is urged into sealing contact with said circumferential surface when transport gas is flowing through said transport gas flowpath.

23. The particle blast system of claim 22, wherein substantially all sealing force between said first surface and said circumferential surface is created by said transport gas flowing through said transport gas flowpath.

24. The particle blast system of claim 16, wherein a wall is defined by said first surface and a second spaced apart surface, said wall being sufficiently flexible to transmit a substantial portion of pressure exerted against said second surface by transport gas to said circumferential surface by said first surface when transport gas is flowing through said transport gas flowpath.

25. The particle blast system of claim 16, wherein said transport gas is able to flow from said at least one first opening to said at least one second opening only through those of said plurality of pockets disposed between said first and second positions.

26. The particle blast system of claim 16, wherein a portion of said transport gas does not flow through said first and second openings.

27. The particle blast system of claim 16, comprising a passageway defined at least partially by said seal, a portion of transport gas being able to flow from said at least one first opening to said at least one second opening through said first passageway.

28. The particle blast system of claim 16, wherein said plurality of pockets are arranged such that said transport gas is able to flow continuously from said at least one first opening to said at least one second opening when said rotor is rotated.

29. The particle blast system of claim 16, wherein said wall contacts said peripheral surface over an angle of about 180°.

30. The particle blast system of claim 16, wherein said seal is of unitary construction.

31. A feeder configured to transport blast media from a source into a flow of transport gas, said feeder comprising:
 a) a rotor having a circumferential surface, said rotor being rotatable about an axis of rotation;
 b) a plurality of pockets disposed in said circumferential surface, each of said plurality of pockets being cyclically disposed between a first position and a second position when said rotor is rotated about said axis;
 c) a transport gas flowpath, said transport gas flowpath having an inlet and an outlet, said inlet being configured to be connected to a source of transport gas;
 d) a seal having a first surface contacting at least a portion of said circumferential surface, said first surface having at least one first opening disposed adjacent said circumferential surface, said seal defining a first passageway which is in fluid communication with said at least one first opening and with said inlet, said seal defining a second passageway which is in fluid communication with said at least one first opening and said outlet, said first passageway being in fluid communication with said second passageway at said at least one first opening.

32. The feeder of claim 31, further comprising a wall disposed between said first and second passageways, said wall having a first edge spaced from said circumferential peripheral surface forming a gap between said wall and said circumferential surface, a portion of said flow of transport gas being able to flow through said gap from said first passageway to said second passageway.

* * * * *